(12) United States Patent
Xu et al.

(10) Patent No.: US 11,924,697 B2
(45) Date of Patent: Mar. 5, 2024

(54) METHOD FOR SUPPORTING HANDOVER

(71) Applicant: Samsung Electronics Co., Ltd., Suwon-si (KR)

(72) Inventors: Lixiang Xu, Beijing (CN); He Wang, Beijing (CN); Songhui Shen, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 17/507,605

(22) Filed: Oct. 21, 2021

(65) Prior Publication Data

US 2022/0124569 A1    Apr. 21, 2022

(30) Foreign Application Priority Data

Oct. 21, 2020  (CN) .......................... 202011133760.1
Oct. 15, 2021  (CN) .......................... 202111203982.0

(51) Int. Cl.
*H04W 36/00* (2009.01)
*H04W 40/36* (2009.01)
*H04W 76/12* (2018.01)

(52) U.S. Cl.
CPC ... *H04W 36/0069* (2018.08); *H04W 36/0061* (2013.01); *H04W 40/36* (2013.01); *H04W 76/12* (2018.02)

(58) Field of Classification Search
CPC ......... H04W 36/0069; H04W 36/0061; H04W 36/02; H04W 40/36; H04W 76/12; H04W 36/00; H04W 36/0005; H04W 36/0055
See application file for complete search history.

(56) References Cited

U.S. PATENT DOCUMENTS

| 10,595,239 | B2 | 3/2020 | Wu et al. |
| 2021/0120613 | A1* | 4/2021 | Li ........................... H04L 45/74 |
| 2021/0235334 | A1* | 7/2021 | Purkayastha ..... H04W 28/0819 |
| 2021/0352543 | A1* | 11/2021 | Purkayastha ......... H04W 76/11 |
| 2022/0030488 | A1* | 1/2022 | Han ...................... H04L 5/0098 |

(Continued)

OTHER PUBLICATIONS

International Search Report and Written Opinion of the International Searching Authority dated Jan. 24, 2022, in connection with International Application No. PCT/KR2021/014820, 7 pages.

(Continued)

*Primary Examiner* — Robert C Scheibel

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a first node is provided, comprising determining whether direct data forwarding between a third node and a second node is available, performing direct data forwarding if the direct data forwarding is available, otherwise, performing indirect data forwarding.

20 Claims, 11 Drawing Sheets

(56) References Cited

U.S. PATENT DOCUMENTS

2022/0182896 A1* 6/2022 Talebi Fard ...... H04W 36/0085
2022/0322167 A1* 10/2022 Liu ...................... H04W 36/02

OTHER PUBLICATIONS

3GPP TS 38.300 V16.3.0 (Sep. 2020), Technical Specification, 3rd Generation Partnership Project; Technical Specification Group Radio Access Network; NR; NR and NG-RAN Overall Description; Stage 2 (Release 16), Sep. 2020, 149 pages.

Nokia, et al., "SA to EN DC handover and direct forwarding with shared SgNB/gNB," R3-201217, 3GPP TSG-RAN WG3#107-e, E-Meeting, Feb. 24-Mar. 6, 2020, 11 pages.

Nokia, et al., "Inter-system direct forwarding with shared en-gNB/gNB," R3-204849, 3GPP TSG-RAN WG3#109, E-Meeting, Aug. 17-27, 2020, 5 pages.

Qualcomm Incorporated, "Direct data forwarding from source node to target SgNB in NR SA to EN-DC inter-system handover," R3-204712, 3GPP TSG-RAN WG3 Meeting #109-e, E-meeting, Aug. 17-28, 2020, 3 pages.

* cited by examiner

METHOD FOR SUPPORTING HANDOVER

CROSS-REFERENCE TO RELATED APPLICATIONS

This application is based on and claims priority under 35 U.S.C. § 119 to Chinese Patent Application No. 202011133760.1, filed on Oct. 21, 2020, and Chinese Patent Application No. 202111203982.0, filed on Oct. 15, 2021, in the China National Intellectual Property Administration, the disclosure of which is incorporated by reference herein in its entirety.

BACKGROUND

1. Field

The application relates to a wireless communication technology, in particular to a method for supporting a handover operation.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In order to meet an increasing demand for wireless data communication services since a deployment of 4G communication system, efforts have been made to develop an improved 5G or pre-5G communication system. Therefore, the 5G or pre-5G communication system is also called "beyond 4G network" or "post LTE system".

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

For data forwarding in the handover from dual connectivity to single connectivity, there are still problems on how the source master base station, source secondary base station, target base station, and core network coordinate their work. There is currently no solution for how to decide whether to use direct data forwarding or indirect data forwarding, especially the data forwarding between the source secondary base station and the target base station.

SUMMARY

The method for supporting handover of the present disclosure can resolve the problem of direct data forwarding or indirect data forwarding during the handover procedure from dual connectivity to single connectivity, ensure the coordinated work of the source master base station, source secondary base station, target base station, and core network, reduce data loss, reduce data interruption time, improve the efficiency of data forwarding and ensure service continuity.

According to an aspect of the present disclosure, a method performed by a first node is provided, comprising: determining whether direct data forwarding between a third node and a second node is available, and performing direct data forwarding if the direct data forwarding is available, otherwise, performing indirect data forwarding.

Alternatively, determining whether direct data forwarding between a third node and a second node is available comprises determining whether the direct data forwarding is available according to whether there is an interface between the first node and the third node and whether there is an interface between the second node and the third node.

Alternatively, further comprises transmitting information about the direct data forwarding path availability according to whether the direct data forwarding path between the first node and the third node is available.

Alternatively, further comprises transmitting an identifier of the second node to the third node.

Alternatively, further comprises: if the third node receives the information about direct data forwarding path availability, the third node determines whether the direct data forwarding path between the second node and the third node is available according to the received identifier of the second node; if the direct data forwarding path between the second node and the third node is also available, the third node decides to use the direct data forwarding; if the third node does not receive the information about the direct data forwarding path availability, or the third node determines the direct data forwarding path between the second node and the third node is unavailable based on the received identifier of the second node, the third node decides to use the indirect data forwarding.

Alternatively, determining whether direct data forwarding between a third node and a second node is available comprises, for a bearer terminated at the first node or the second node, determining whether the direct data forwarding is available according to whether the direct data forwarding path between the first node and the third node is available.

Alternatively, further comprises transmitting information about the direct data forwarding path availability according to whether the direct data forwarding path between the first node and the third node is available.

Alternatively, indication information of whether to terminate at the first node or the second node is transmitted.

Alternatively, further comprises transmitting an identifier of the second node to the third node.

Alternatively, further comprises: for the bearer terminated at the first node, if the third node receives the information about direct data forwarding path availability, the third node allocates the first tunnel information; if the third node does not receive the information about the direct data forwarding path availability, the third node allocates the second tunnel information; for the bearer terminated at the second node, the third node determines whether the direct data forwarding path between the second node and the third node is available according to the received identifier of the second node, if the direct data forwarding path between the second node and the third node is available, the third node decides to use the direct data forwarding path between the second node and the third node, otherwise use indirect data forwarding.

Alternatively, further comprises: transmitting the identifier of the second node to the third node; determining whether direct data forwarding between the third node and the second node is available comprises; and determining that direct data forwarding is available, if the information about direct data forwarding availability between the second node and the third node is received.

Alternatively, the tunnel information for data forwarding is received.

Alternatively, further comprises: for the bearer terminated at the second node, if the direct data forwarding between the second node and the third node is available, the first node transmits the received the tunnel information for data forwarding to the second node; if the direct data forwarding between the second node and the third node is unavailable, the first node allocates the tunnel information for data forwarding from the second node to the first node, and transmits the allocated tunnel information for data forwarding to the second node.

Alternatively, the identifier of the second node is included in a source-to-target transparent container.

Alternatively, the information about the direct data forwarding path availability between the second node and the third node is included in a target-to-source transparent container.

Alternatively, determining whether direct data forwarding between the third node and the second node is available comprises: the first node knows whether there is an interface between the second node and the third node through Operation Administration and Maintenance of the OAM configuration, and determining that the direct data forwarding is available, if the first node knows that there is the interface between the second node and the third node according to the OAM configuration.

According to an aspect of the present disclosure, a method performed by a third node is provided, comprising: determining whether direct data forwarding between the third node and a second node is available, and performing direct data forwarding if the direct data forwarding is available, otherwise, performing indirect data forwarding.

Alternatively, determining whether direct data forwarding between the third node and the second node is available, comprises: receiving the identifier of the second node from the first node; determining whether the direct data forwarding path between the second node and the third node is available according to the identifier of the second node; and transmitting the information about the direct data forwarding path availability between the second node and the third node to the first node, if the direct data forwarding path between the second node and the third node is available.

Alternatively, the third node transmits the information to the first node through the target-to-source transparent container in a handover request acknowledgement message and a handover command message, or the third node directly includes the information in the handover request acknowledgement message and the handover command message.

Alternatively, further comprises the tunnel information for data forwarding is allocated and transmitted.

Alternatively, the identifier of the second node is included in the source-to-target transparent container.

According to an aspect of the present disclosure, a first node for supporting handover is provided, which is configured to implement the method according to the method for the first node provided in the present disclosure.

According to an aspect of the present disclosure, a third node for supporting is provided, which is configured to implement the method according to the method for the third node provided in the present disclosure.

Through the above-mentioned method for supporting handover, the problem of direct data forwarding or indirect data forwarding during the handover procedure from dual connectivity to single connectivity, especially the problem of direct data forwarding from the secondary base station to the target base station can be resolved, ensure the coordinated work of the source master base station, source secondary base station, target base station, and core network, avoid the influence on the core network, reduce data loss, reduce data interruption time, improve data forwarding efficiency, and ensure service continuity.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

The present disclosure will be more easily understood through the following detailed description with the accompanying drawings, in which the same reference numeral refers to the unit of the same structure, and wherein.

DETAILED DESCRIPTION

Figure 1:
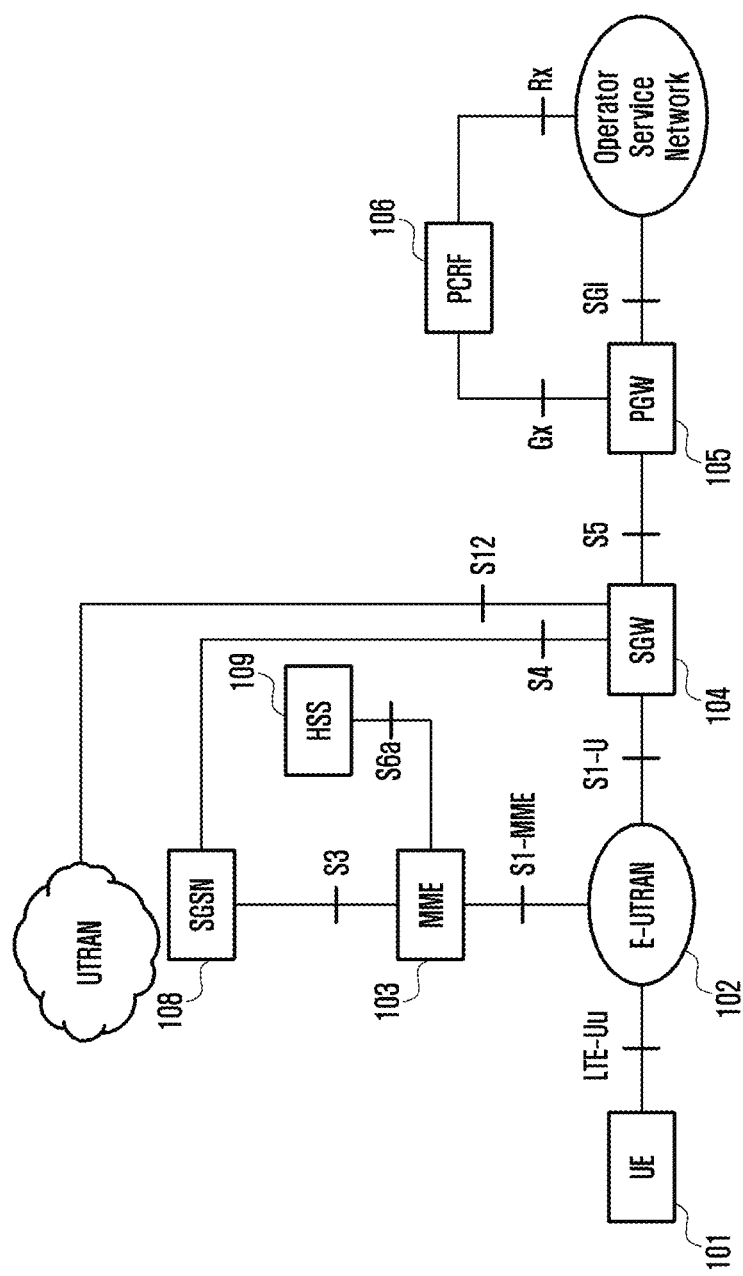
FIG. 1 illustrates a diagram of the system architecture of System Architecture Evolution (SAE) according to an embodiment of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments of the present application are described in detail below. Examples of the embodiments are shown in the accompanying drawings, in which the same or similar reference numerals indicate the same or similar elements or elements with the same or similar functions. The embodiments described below with reference to the drawings are exemplary, and are only used to explain the present application, and cannot be construed as a limitation to the present application.

Those skilled in the art can understand that, the singular forms "a", "an", "said" and "the" used herein may also include plural referents unless the context clearly dictates otherwise. It should be further understood that the term "comprising" used in the specification of this application refers to the presence of the described features, integers, steps, operations, elements and/or components, but does not exclude the presence or addition of one or more other features, integers, steps, operations, elements, components, and/or groups of them.

Unless defined differently, all terms used herein, which include technical terminologies or scientific terminologies, have the same meaning as that understood by a person skilled in the art to which the present disclosure belongs. It should also be understood that such terms as those defined in a generally used dictionary are to be interpreted to have the meanings equal to the contextual meanings in the relevant field of art, and are not to be interpreted to have ideal or excessively formal meanings unless clearly defined in the present disclosure.

FIGS. 1 to 9 discussed below and various embodiments for describing the principles of the present disclosure in this patent document are only for illustration and should not be interpreted as limiting the scope of the disclosure in any way. Those skilled in the art will understand that the principles of the present disclosure can be implemented in any suitably arranged system or device.

FIG. 1 illustrates an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
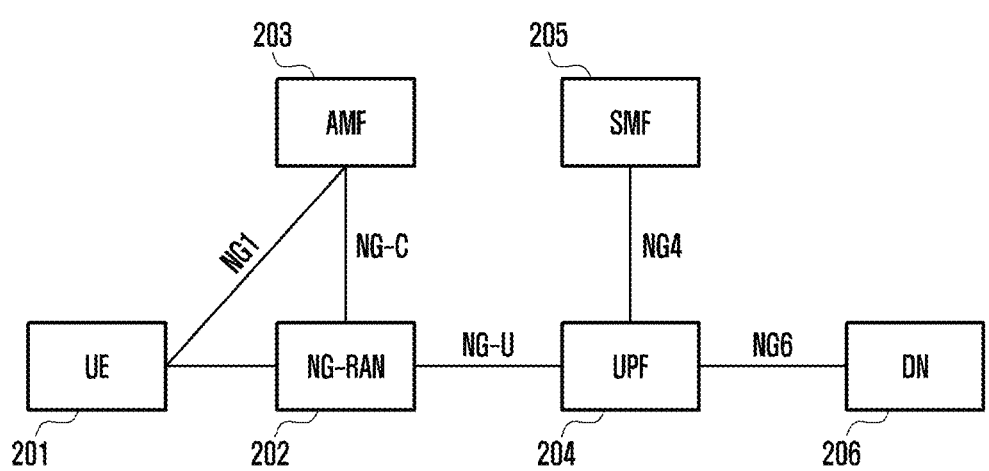
FIG. 2 illustrates a schematic diagram of the initial overall architecture of 5G according to an embodiment of the present disclosure.

FIG. 2 illustrates an exemplary system architecture 200 according to various embodiments of the present disclosure. Other embodiments of the system architecture 200 can be used without departing from the scope of the present disclosure.

User equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity (SMF) 205 is responsible for session management. A data network (DN) 206 includes, for example, services of operators, access of Internet and service of third parties.

When the UE moves between two base stations, in order to ensure service continuity, the UE needs to support data forwarding during the handover procedure, including intra-system handovers such as handover between gNB and gNB, handover between gNB and eNB connected to 5GC, and also includes inter-system handovers such as 5G systems (5GS) and evolved packet systems (EPS).

For a handover procedure with dual-connectivity at the source side of the handover, there is no solution to decide whether to use direct data forwarding or indirect data forwarding. Dual connectivity refers to that the UE accesses the network through two base stations at the same time, one base station is the master base station (or a master node, MN), and the other base station is the secondary base station (or a secondary node SN). Dual connectivity includes dual connectivity under the same radio access technology (RAT) and dual connectivity of different RATs, such as E-UTRA NR dual connectivity (EN-DC). The UE accesses the core network through the master base station. The base station seen from the core network is the master base station. Single connectivity means that the UE only accesses one base station at the same time. There are still problems when the solution for the handover from single connectivity to single connectivity is used for the handover from dual connectivity to single connectivity or the handover from dual connectivity to dual connectivity.

For example, the source master base station (MN) determines the direct forwarding path availability between the source master base station and the target base station and transmits information about the direct data forwarding path availability to the MME, and the MME transmits direct forwarding indication to the AMF, the AMF transmits the information about direct data forwarding path availability or indirect data forwarding path availability to the SMF, and the SMF transmits the direct data forwarding path availability to the target NG-RAN node. The target NG-RAN node allocates an E-UTRAN radio access bearer (E-RAB) tunnel for data forwarding based on this information. The E-RAB tunnel for data forwarding is transmitted to the source master base station through the 5G core network and the 4G core network. If the source master base station transmits the E-RAB tunnel for data forwarding allocated by the target base station to the source secondary base station (SN), and there is no interface between the source secondary base station and the target base station, the data forwarding between the source secondary base station and the target base station cannot be performed, resulting in data loss.

In the present disclosure, the source master base station (source MN) or the source base station may be the first node, the source secondary base station (source SN) may be the second node, and the target base station may be the third node. This corresponding relationship is only used to interpret this application and cannot be construed as a limitation on this application.

The present disclosure provides the following ways to resolve this problem.

Way 1: direct forwarding path availability is set based on the principle of source MN. If there is an interface between the source MN and the target base station, the handover required message includes direct forwarding path availability. The core network stores the received direct forwarding path availability. After the core network receives the tunnel information for data forwarding from the target base station, according to direct forwarding path availability, the core network transmits the received tunnel information for data forwarding allocated by the target base station to the source base station, where the source base station is also the source master base station. If the core network does not receive the direct forwarding path availability from the source base station, the core network allocates tunnel information for data forwarding and transmits the tunnel information to the source base station. For 5GS intra-system handover, the functions of the core network here can be performed in AMF, SMF and/or UPF. For the inter-system handover from the 4G system to the 5G system, the functions of the core network here can be performed in the entity AMF, SMF, UPF, and/or MME. The functions of specific core network entities are described in subsequent embodiments. This way supports the method of data forwarding during the handover procedure from connectivity to connectivity to avoid the influence on the function of the core network entity, while ensuring the feasibility of direct data forwarding and indirect data forwarding, avoiding data loss, and ensuring service continuity during the handover procedure.

According to the way 1, there are two methods to determine the direct data forwarding availability between the source SN and the target base station.

Method 1: the source MN transmits the identifier information of the source SN to the target base station, and the target base station decides whether direct data forwarding between the source SN and the target base station is available or whether there is an interface between the source SN and the target base station, or whether the direct data forwarding path between the source SN and the target base station is available, and informs the source MN that direct data forwarding between the source SN and the target base station is available, or that there is an interface between the source SN and the target base station, or that the direct data forwarding path between the source SN and the target base station is available. Only when the source MN has an interface between the source MN and the target base station or transmits direct forwarding path availability to the core network, the identifier information of the source SN is included in the handover required message. When the target base station receives the identifier of the source SN, the target base station judges whether direct data forwarding between the source SN and the target base station is available, or whether there is an interface between the source SN and the target base station, or a direct data forwarding path between the source SN and the target base station is available.

Method 2: the source master base station knows whether there is an interface between the source secondary base station and the target base station through operation administration and maintenance (OAM) configuration.

The source master base station decides whether to use direct data forwarding or indirect data forwarding between the source SN and the target base station. According to either of the above two methods, the source MN knows that direct data forwarding between the source SN and the target base station is available, or there is an interface between the source SN and the target base station, or the direct data forwarding path between the source SN and the target base station is available.

When the source MN receives the tunnel information for data forwarding, the source MN transmits the received data tunnel information to the source SN. For a bearer terminated at the source SN, the source MN transmits the received data tunnel information to the source SN. If there is an interface between the source MN and the target base station or the source MN transmits direct forwarding path availability to the core network, and when the source MN receives the tunnel information for data forwarding, for the direct data forwarding between the source SN and the target base station, the source MN transmits the received data tunnel information to the source SN. For a bearer terminated at the source SN, the source MN transmits the received data tunnel information to the source SN.

If there is an interface between the source MN and the target base station or the source MN transmits direct forwarding path availability to the core network, the source MN does not receive the information about direct data forwarding availability between the source SN and the target base station, or does not receive the information that there is an interface between the source SN and the target base station, or does not receive the information about the direct data forwarding path availability between the source SN and the target base station, or receives the information that there is no interface between the source SN and the target base station, or knows that there is no interface between the source SN and the target base station according to the OAM configuration, the source MN allocates the tunnel information for data forwarding from the source SN to the source MN, the source MN transmits the allocated tunnel information for data forwarding to the source SN. For a bearer terminated at the source SN, the source MN allocates the tunnel information for data forwarding and transmits the tunnel information to the source SN. The source SN forwards the data to the source MN, and the source MN forwards the data to the target base station.

Way 2: consider, at the same time, whether there is an interface between the source master base station and the target base station and whether there is an interface between the source secondary base station and the target base station to determine whether to use direct data forwarding or indirect data forwarding. When the direct data forwarding path between the source master base station and the target base station is available and the direct data forwarding path between the source secondary base station and the target base station is available, direct data forwarding is used, otherwise, indirect data forwarding is used.

The source MN transmits the direct data forwarding path availability to the core network according to the direct data forwarding path availability between the source MN and the target base station. The core network transmits the direct data forwarding path availability to the target base station. The source MN transmits the identifier of the source SN to the target base station. The source MN transmits the identifier of the source SN to the target base station through the core network, and the specific method for transmitting is the same as in the way 1 of the present disclosure and will not be repeated here.

The target base station decides whether to use direct data forwarding or indirect data forwarding. If the target base station receives the information about the direct data forwarding path availability, the target base station judges whether the direct data forwarding path between the source SN and the target base station is available according to the received identifier of the source SN, if the direct data forwarding path between the source SN and the target base station is also available, the target base station decides to use direct data forwarding. For inter-system handover from 4G to 5G, the target base station allocates an E-RAB tunnel for data forwarding. If the target base station does not receive the information about the direct data forwarding path availability, or the target base station judges that the direct data forwarding path between the source SN and the target base station is unavailable according to the received identifier of the source SN, the target base station decides to use indirect data forwarding. For inter-system handover from 4G to 5G, the target base station allocates a protocol data unit (PDU) session tunnel for data forwarding. For 5G intra-system handover, whether it is direct data forwarding or indirect data forwarding, the target base station allocates PDU session tunnel(s) and/or data radio bearer (DRB) tunnel(s).

Way 3: for a bearer terminated at the source master base station, whether to use direct data forwarding or indirect data forwarding is determined according to whether direct data forwarding between the source master base station and the target base station is available. For a bearer terminated at the source SN, whether to use direct data forwarding or indirect data forwarding is determined according to whether direct data forwarding between the source secondary base station and the target base station is available.

The source MN transmits the direct data forwarding path availability to the core network according to the direct data forwarding path availability between the source MN and the target base station. The core network transmits the direct data forwarding path availability to the target base station. The source MN transmits the identifier of the source SN to the target base station. The source MN transmits the identifier of the source SN to the target base station through the core network, and the specific method for transmitting is the same as in the way 1 of the present disclosure and will not be repeated here.

For the inter-system handover from the 4G system to the 5G system, for a E-RAB proposing to forward data, the source master base station includes the indication information about whether the E-RAB terminated at the source MN or at the source SN. The indication information about whether the E-RAB terminated at the source MN or the source SN may be included in the source-to-target transparent container or directly included in the handover required message. For a bearer terminated at the source MN, if the target base station receives that the direct data forwarding path is available, the target base station allocates E-RAB tunnel information; if the target base station does not receive that the direct data forwarding path is available, the target base station allocates PDU session tunnel information. For a bearer terminated at the source SN, the target base station judges whether the direct data forwarding path between the source SN and the target base station is available according to the received identifier of the source SN.

If the direct data forwarding path between the source SN and the target base station is available, the target base station determines the source SN and the target base station may use direct data forwarding, otherwise use indirect data forwarding. For direct data forwarding, the target base station allocates E-RAB tunnel information. For indirect data forwarding, the target base station allocates PDU session tunnel information. SMF knows whether direct data forwarding or indirect data according to the received E-RAB tunnel or PDU session tunnel.

For indirect data forwarding, SMF or UPF allocates the tunnel information for data forwarding and transmits the tunnel information to MME through AMF. For direct data forwarding, the SMF transmits the received tunnel information for data forwarding allocated by the target base station to the MME through the AMF. The MME knows the direct data forwarding according to the direct data forwarding path availability received from the handover required message. For direct data forwarding, the MME transmits the received tunnel information for data forwarding to the source base station, wherein the source base station is also the source master base station. If the MME does not receive that the direct data forwarding path is available, it is indirect data forwarding.

For indirect data forwarding, the MME requests the SGW to allocate tunnel information for data forwarding and transmit tunnel information for data forwarding to the source base station, wherein the source base station is also the source master base station. The source master base station receives the tunnel information for data forwarding. For a bearer terminated at the source SN, the source master base station transmits the received bearer information to the source secondary base station. The source master base station and the source secondary base station forward data according to the received tunnel information for data forwarding.

The exemplary embodiments of the present disclosure are further described below with reference to the accompanying drawings.

Figure 3:
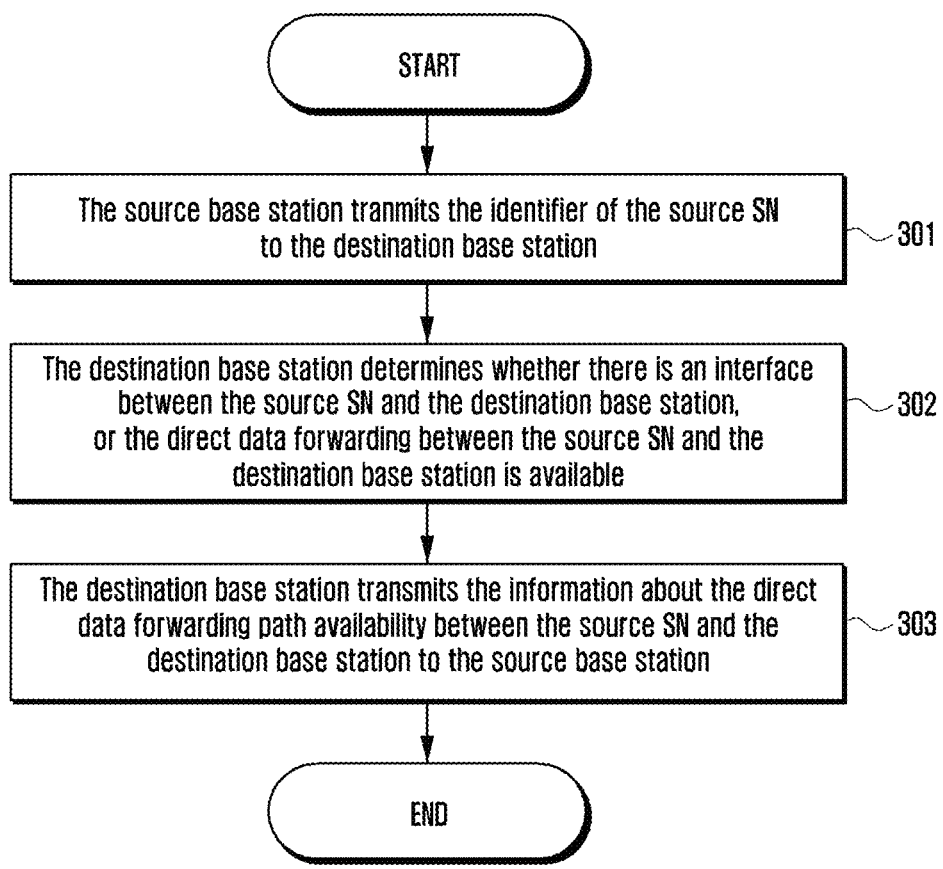
FIG. 3 illustrates a schematic diagram of a method for supporting handover according to an embodiment of the present disclosure.

FIG. 3 illustrates a schematic diagram of a method for supporting handover according to an embodiment of the present disclosure. This method can be used for intra-system handover or inter-system handover. The method includes steps as shown below.

Step 301: the source base station transmits the identifier of the source SN to the target base station. The source base station is also the source master base station, and the same below. The identifier of the source SN may be any identifier information that can directly or indirectly uniquely identify a base station, such as a global base station identifier or a primary secondary cell (PScell) global identifier. The source base station transmits the identifier of the source SN to the target base station through the core network. The source base station transmits the identifier of the source SN to the target base station through the handover required message from the source base station to the core network and the handover request message from the core network to the target base station. The source base station transmits the identifier of the source SN to the target base station through the source-to-target transparent container in the handover required message and the handover request message, or the source base station directly includes the identifier of the source SN in the handover required message and the handover request message.

If there is an interface between the source MN and the target base station, the handover required message includes direct forwarding path availability. The core network stores the received direct forwarding path availability information. When there is an interface between the source MN and the target base station or the source MN includes direct forwarding path availability in the handover required message, the source MN includes the identifier of the source SN in the handover required message.

Step 302: the target base station receives the identifier information of the source SN. The target base station determines whether there is an interface between the source SN and the target base station, or whether there is a secure interface between the source SN and the target base station, or the direct data forwarding path between the source SN and the target base station is available, or the direct data forwarding between the source SN and the target base station is available. The purpose that there is an interface between the source SN and the target base station, there is a secure interface between the source SN and the target base station, and the direct data forwarding path between the source SN and the target base station is available and the direct data forwarding between the source SN and the target base station is available is the same, the meanings can be substituted for each other. In the following, that the direct data forwarding path is available between the source SN and the target base station can be used to illustrate. If the target base station accepts downlink data forwarding or the target base station proposes uplink data forwarding, the target base station determines whether the direct data forwarding path between the source SN and the target base station is available. The target base station allocates tunnel information for downlink data forwarding. If the target base station proposes uplink data forwarding, the target base station allocates tunnel information for uplink data forwarding.

Step 303: the target base station transmits the information about the direct data forwarding path availability between the source SN and the target base station to the source base station. The target base station transmits the information to the source base station through the core network. The target base station transmits the information to the source base station through a handover request acknowledgement message from the target base station to the core network and a handover command message from the core network to the source base station. The target base station transmits the information to the source base station through the target-to-source transparent container in the handover request acknowledgement message and the handover command message, or the target base station directly includes the information in the handover request acknowledgement message and the handover command message. When the target base station accepts downlink data forwarding or the target base station proposes uplink data forwarding, the target base station includes the information in the handover request acknowledgement message and the handover command message.

The core network receives the tunnel information for data forwarding from the target base station. For direct data forwarding, the core network transmits the tunnel information for data forwarding received from the target base station to the source base station. If the core network receives or stores direct forwarding path availability, direct data forwarding is feasible. For indirect data forwarding, the core network allocates tunnel information for data forwarding and transmits the tunnel information to the source base station. For 5GS intra-system handover, the functions of the core network here can be performed in AMF, SMF and/or UPF. For the inter-system handover from the 4G system to the 5G system, the functions of the core network here can be performed in the entity AMF, SMF, UPF, and/or MME. The method of the present disclosure does not change the function allocation of the core network entities and does not change each core network entity's function for supporting data forwarding function, therefore, no specific description is made for each functional entity. The present disclosure supports the method of data forwarding during the handover procedure from dual connectivity to single connectivity to avoid the influence on core network entity functions, while ensuring the feasibility of direct data forwarding and indirect data forwarding, avoiding data loss, and ensuring service continuity during the handover procedure.

The source base station receives the tunnel information for data forwarding. If the source base station receives the information about the direct data forwarding path availability between the source SN and the target base station, the source MN transmits the received tunnel information for data forwarding to the source SN for a bearer terminated at the SN. In this way, the source SN directly forwards the data to the target base station. If there is an interface between the source MN and the target base station or the source MN transmits direct forwarding path availability to the core network, the source MN does not receive the information about the direct data forwarding path availability between the source SN and the target base station or the source MN knows that the direct data forwarding path between the source SN and the destination is unavailable according to the configuration, the source MN allocates tunnel information for data forwarding from the source SN to the source MN, and the source MN transmits the allocated tunnel information for data forwarding to the source SN. For a bearer terminated at the source SN, the source MN performs the above operations. In this way, the source SN forwards the data to the source MN, and the data is transmitted to the target base station through the source MN.

So far, the description of the method for supporting handover in the present disclosure is completed. The method can resolve the problem of direct data forwarding or indirect data forwarding during the handover procedure from dual connectivity to single connectivity, ensure the coordinated work of the source master base station, source secondary base station, target base station, and core network, and avoid the influence on the core network, reduce data loss, reduce data interruption time, improve the efficiency of data forwarding and ensure service continuity.

Figure 4:
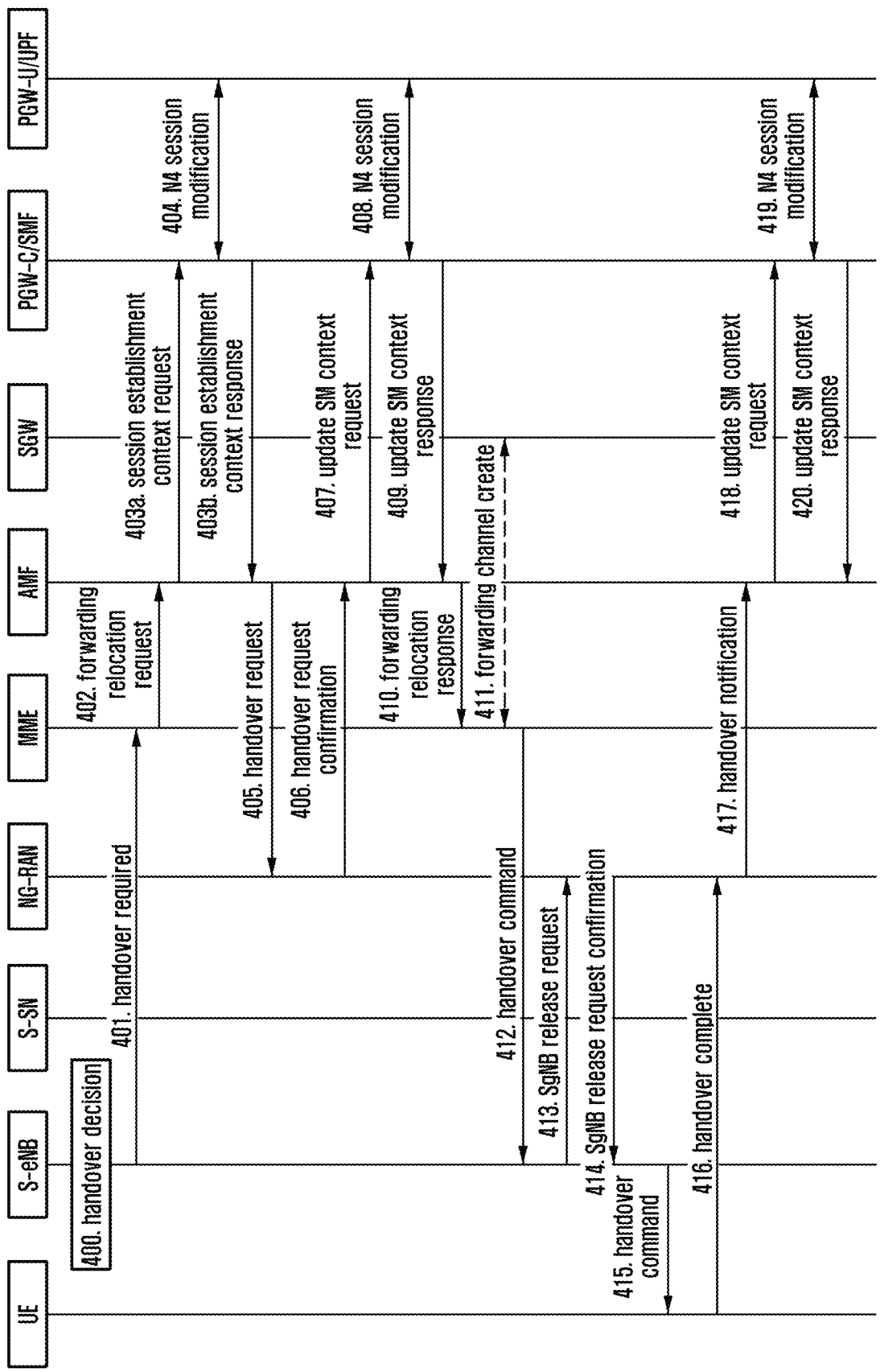
FIG. 4 illustrates a schematic diagram of Embodiment 1 of a method for supporting handover according to the present disclosure.

FIG. 4 illustrates a schematic diagram of Embodiment 1 of the method for supporting handover according to the present disclosure. This embodiment is used for the handover from EN-DC (EUTRA-NR dual connectivity) to standalone architecture (SA). Detailed descriptions of steps not related to the present disclosure are omitted here. The following steps are comprised as shown below.

Step 400: the source eNB (S-eNB) decides to handover a UE to the NG-RAN node.

The NG-RAN node here may be a gNB or an eNB connected to the 5GC or a centralized unit (CU) in the gNB. The eNB connected to the 5GC may also be referred to as ng-eNB.

Step 401: the source eNB transmits a handover required message to the MME. The message includes a source-to-target transparent container. The message includes information about the direct data forwarding path availability. When the direct data forwarding path between the source eNB and the target base station is available, the message includes the direct data forwarding path availability. The message includes the identifier of the source SN. When the message includes the information about the direct data forwarding path availability, the message includes the identifier of the source SN. The identifier of the source SN is specifically the same as that in step 301, which will not be repeated here. The identifier of the source SN may be included in the source-to-target transparent container. The source-to-target transparent container here is a source NG-RAN node-to-target NG-RAN node transparent container.

The handover required message includes one or multiple E-RAB information, and the E-RAB information includes an E-RAB identifier, downlink data forwarding, and/or information of whether the E-RAB terminates at the master base station or the secondary base station. The one or multiple E-RAB information may be included in the source-to-target transparent container, or in the handover required message, or in both the handover required message and the source-to-target transparent container. In this embodiment, the source-to-target transparent container is a source NG-RAN node-to-target NG-RAN node transparent container. When the direct data forwarding path between the source eNB and the target base station is unavailable, the handover required message may include the information about whether the E-RAB terminates at the master base station or the secondary base station. If the information is directly included in the handover required message, the MME saves the received information after receiving it.

Step 402: the MME transmits a forwarding relocation request message to the AMF. The message includes the identifier of the source SN. The identifier of the source SN may be included in the source-to-target transparent container.

The message may also include one or multiple E-RAB information, and the E-RAB information is the same as that in step 401, which will not be repeated here. The one or multiple E-RAB information may be included in the source-to-target transparent container.

The MME transmits a direct forwarding indication to the AMF. The direct forwarding indication may indicate direct data forwarding or indirect data forwarding. The direct forwarding indication may also be called a direct forwarding flag. If the MME does not receive the direct data forwarding path availability from the source eNB, the MME decides whether indirect data forwarding is available. The MME informs the AMF of the direct data forwarding or indirect data forwarding. The MME may also inform the AMF that data forwarding is not possible, wherein the data forwarding not possible means that direct data forwarding and indirect data forwarding are both not possible. Alternatively, the MME can also inform the AMF of the information about direct data forwarding availability.

Step 403a: the AMF transmits a session establishment (SM) context request message to the SMF.

The AMF transmits the message to each SMF serving the UE.

The AMF transmits a direct forwarding indication to the SMF, and the direct forwarding indication can indicate direct data forwarding or indirect data forwarding. AMF informs SMF of the information about direct data forwarding availability or indirect data forwarding availability.

Step 404: the SMF initiates the N4 session modification procedure with the UPF.

Step 403b: the SMF transmits a session establishment context response message to the AMF. The message includes the N2 session management (SM) information container.

If the SMF receives direct data forwarding availability, the SMF includes the direct data forwarding path availability in the N2 SM information container. If neither direct data forwarding nor indirect data forwarding is available, the SMF includes that data forwarding not possible in the N2 SM information container.

Step 405: the AMF transmits a handover request message to the NG-RAN. The message includes a source-to-target transparent container. The message includes the identifier of the source SN. The identifier of the source SN may be included in the source-to-target transparent container. The source-to-target transparent container here is a source NG-RAN-to-target NG-RAN transparent container.

The message may also include one or multiple E-RAB information, and the E-RAB information is the same as that in step 401, which will not be repeated here. The one or multiple E-RAB information may be contained in the source-to-target transparent container.

The message includes information about the direct data forwarding path availability or data forwarding not possible. The information may be included in the N2 SM information container. The data forwarding not possible refers to the unavailability of direct data forwarding and indirect data forwarding.

The message may also include the mapping between a QoS flow and an EPS bearer in the PDU session, that is, the E-RAB identifier mapped by a QoS flow and/or the mapped QoS information.

Step 406: the NG-RAN transmits a handover request acknowledgement message to the AMF.

The message includes a target-to-source transparent container. Here, the target-to-source transparent container is a target NG-RAN node-to-source NG-RAN node transparent container.

If the target NG-RAN node receives the direct data forwarding path availability, the direct data forwarding can be used. If it is direct data forwarding, for a QoS flow accepted for data forwarding or a E-RAB accepted for data forwarding by the NG-RAN node, the NG-RAN node allocates tunnel information for downlink data forwarding for the corresponding E-RAB, the E-RAB identifier and the downlink tunnel information corresponding to the E-RAB allocated by the NG-RAN are included in the handover request acknowledgement message. If it is indirect data forwarding, for a QoS flow accepted for data forwarding, the NG-RAN node allocates tunnel information for downlink data forwarding for the PDU session to which the QoS flow belongs, and the PDU session identifier and the downlink tunnel information corresponding to the PDU session allocated by the NG-RAN are included in the handover request acknowledgement message, and a list of QoS flows accepted data forwarding is also included in the handover request acknowledgement message. If data forwarding is not possible, the NG-RAN node does not need to allocate tunnel information for data forwarding.

If the target NG-RAN receives the identifier of the source SN, the target NG-RAN determines whether direct data forwarding path between the source SN and the target base station is available or whether direct data forwarding is feasible. If the direct data forwarding path is available, the target NG-RAN node includes the information about the direct data forwarding path availability or the direct data forwarding feasibility between the source SN and the target base station in the handover request acknowledgement message. The information may also be included in the target-to-source transparent container in the handover request acknowledgement message or may be included in both the handover request acknowledgement message and the target-to-source transparent container in the handover request acknowledgement message.

The target NG-RAN node receives the E-RAB information including the information about whether the E-RAB terminates at the master base station or the secondary base station. For an E-RAB accepted for data forwarding by the target NG-RAN node, if the E-RAB terminates at the master base station and the target NG-RAN node does not receive the direct data forwarding path availability, the target NG-RAN node allocates tunnel information for downlink data forwarding for the PDU session to which one or more QoS flows mapped to the E-RAB belong. For the E-RAB accepted for data forwarding by the target NG-RAN node, if the E-RAB terminates at the secondary base station and the direct data forwarding path between the source SN and the target base station is available, the target NG-RAN node allocates tunnel information for downlink data forwarding for the corresponding E-RAB; if the E-RAB terminates at the secondary base station and the direct data forwarding path between the source SN and the target base station is unavailable, the target NG-RAN node allocates tunnel information for downlink data forwarding for the PDU session to which one or more QoS flows mapped to the E-RAB belong.

If the target NG-RAN node receives the direct data forwarding path availability, the target NG-RAN node allocates tunnel information for downlink data forwarding for all E-RABs accepted for data forwarding.

The handover request acknowledgement message includes the tunnel information for downlink data forwarding allocated by the target NG-RAN node. The tunnel information for downlink data forwarding may be for each E-RAB or for each PDU session or includes tunnel information for data forwarding for E-RAB and tunnel information for data forwarding for PDU session at the same time. For the tunnel information for data forwarding for E-RAB, the message further includes the corresponding E-RAB identifier. For the tunnel information for data forwarding for PDU session, the message further includes a PDU session identifier.

Step 407: the AMF transmits an update SM context request message to the SMF. If the tunnel information for data forwarding is received from the NG-RAN, the AMF transmits the tunnel information for data forwarding received from the NG-RAN to the SMF. The AMF transmits the tunnel information used for data forwarding received from NG-RAN to SMF. The tunnel information for data forwarding is the same as that in step 406, which will not be repeated here.

If SMF receives the tunnel information for data forwarding for E-RAB, it is direct data forwarding. If SMF receives the tunnel information for data forwarding for PDU session, it is indirect data forwarding. If there is no tunnel information for data forwarding, the data forwarding is not possible or the data forwarding is not accepted by the target base station.

Step 408: the SMF initiates a session modification procedure with the UPF. If SMF receives the tunnel information for data forwarding for PDU session, the SMF transmits the tunnel information for downlink data forwarding over NG allocated by NG-RAN to UPF through the N4 session modification procedure, and the tunnel information for data forwarding is for each PDU session. The SMF allocates tunnel information for data forwarding between the SGW and the UPF, and the tunnel information for data forwarding is for each E-RAB. The N4 session modification message includes the tunnel information for data forwarding between the SGW and the UPF and one or more QoS flow identifiers, and the QoS flow identifiers indicate the QoS flows transmitted on the tunnel. If SMF receives the tunnel information for data forwarding for E-RAB, it is direct data forwarding, and SMF or UPF does not need to allocate tunnel information for data forwarding.

Step 409: the SMF transmits an update SM context response message to the AMF. The SMF transmits tunnel information for data forwarding to AMF. For direct data forwarding, the SMF transmits the tunnel information for each E-RAB received from the AMF in step 407 to the AMF, and the tunnel information for each E-RAB is allocated by the target NG-RAN. For indirect data forwarding, the SMF transmits the tunnel information of each E-RAB allocated by the SMF or UPF to the AMF, and the tunnel information is used for data forwarding between the SGW and the UPF.

If the SMF receives the tunnel for data forwarding for E-RAB and the tunnel for data forwarding for PDU session at the same time in step 407, the tunnel for data forwarding for E-RAB is used for direct data forwarding from the source base station (the source master base station and/or the source secondary base station) to the target base station, and the tunnel for data forwarding for PDU session is used for data forwarding from the UPF to the target base station in the indirect data forwarding. Corresponding to the tunnel for data forwarding for PDU session, the SMF or UPF allocates the tunnel for indirect data forwarding for each E-RAB between the SGW and the UPF. Corresponding to the direct data forwarding, the SMF transmits the tunnel information for each E-RAB received from the AMF in step 407 to the AMF, the tunnel information for each E-RAB is allocated by the target NG-RAN node, and the E-RAB information further includes direct data forwarding indication. Corresponding to the indirect data forwarding, the SMF transmits the tunnel information of each E-RAB allocated by the SMF or UPF to the AMF, the tunnel information is used for data forwarding between the SGW and the UPF, and the E-RAB information further includes indirect data forwarding indication. The message transmitted by the SMF to the AMF includes indication information of whether each tunnel for data forwarding is for direct data forwarding or indirect data forwarding. The tunnel for data forwarding is for each E-RAB.

Step 410: the AMF transmits a forwarding relocation response message to the MME. The message includes the tunnel information for data forwarding. For direct data forwarding, the tunnel information for data forwarding is allocated by the target NG-RAN. For indirect data forwarding, the tunnel information for data forwarding is the tunnel information for data forwarding between SGW and UPF allocated by SMF or UPF. The message includes indication information of whether each tunnel for data forwarding is for direct data forwarding or indirect data forwarding. The tunnel for data forwarding is for each E-RAB.

The message includes a target-to-source transparent container. The message includes the information about the direct data forwarding path availability or direct data forwarding feasibility between the source SN and the target base station, and the information may also be included in the target-to-source transparent container.

Step 411: if the MME receives the tunnel information for data forwarding, for indirect data forwarding, the MME transmits an indirect data forwarding tunnel establishment request message to the SGW. The message is used to transmit tunnel information for data forwarding between the SGW and the UPF to the SGW. The SGW transmits an indirect data forwarding tunnel establishment response message to the MME. The message includes the uplink tunnel information allocated by the SGW for data forwarding on the S1 interface. For direct data forwarding, this step does not need to be performed. The MME knows whether to use direct data forwarding or indirect data forwarding according to the information about the direct data forwarding path availability received from the source base station, specifically as described in step 402.

If the MME receives the indication information of whether each tunnel for data forwarding is for direct data forwarding or indirect data forwarding, for the tunnel for direct data forwarding, the MME does not need to request the SGW to allocate a tunnel for indirect data forwarding, and for the tunnel for indirect data forwarding, the MME requests the SGW to allocate a tunnel for indirect data forwarding.

Step 412: the MME transmits a handover command message to the source eNB. The message includes a target-to-source transparent container. The message includes the information about the direct data forwarding path availability or direct data forwarding feasibility between the source SN and the target base station, and the information may also be included in a target-to-source transparent container.

The message includes the tunnel information for data forwarding. For indirect data forwarding, the tunnel information is allocated by the SGW. For direct data forwarding, the tunnel information is allocated by the target NG-RAN node. The message may include both the tunnel information for direct data forwarding allocated by the target NG-RAN node and the tunnel information for indirect data forwarding allocated by the SGW at the same time. The tunnel for data forwarding is for each E-RAB.

Step 413: the source eNB transmits an SgNB release request message to the source SN.

For bearer(s) terminated at the source SN, if the source base station receives the tunnel information for data forwarding, and the source base station receives the information about the direct data forwarding path availability or direct data forwarding feasibility between the source SN and the target base station, or the eNB knows the direct data forwarding path availability between the source SN and the destination according to the configuration, the source MN transmits the received tunnel information for data forwarding to the source SN. In this way, the source SN directly forwards the data to the target base station. If there is an interface between the source MN and the target base station or the source MN transmits direct forwarding path availability to the core network, the source MN does not receive the information about direct data forwarding availability between the source SN and the target base station or about there is no interface between the source SN and the target base station, or receive the information that there is no interface information between the source SN and the target base station, or the eNB knows that the direct data forwarding path between the source SN and the target base station is unavailable according to the configuration, the source MN allocates the tunnel information for data forwarding from the source SN to the source MN, and the source MN transmits the allocated tunnel information for data forwarding to the source SN. For the bearer(s) terminated at the source SN, the source MN performs the above operations. In this way, the source SN forwards the data to the source MN, and to the target base station through the source MN. If the source MN and the target base station have no interface or the source MN does not transmit the direct forwarding path availability to the core network, the source MN node transmits the received tunnel for indirect data forwarding to the source SN, and the source SN forwards the data to the target base station through the core network.

Step 414: the source SN transmits an SgNB release request acknowledge message to the source MN.

Step 415: the source eNB transmits a handover command message to the UE.

The source eNB forwards the data. For an E-RAB that the data forwarding tunnel is received, it means that the target base station has accepted the data forwarding, and the source eNB forwards the data to the corresponding tunnel.

Step 416: the UE transmits a handover completion message to the NG-RAN.

Step 417: the NG-RAN transmits a handover notify message to the AMF. The message includes the tunnel information for downlink data transmission allocated by NG-RAN.

Step 418: the AMF transmits an update SM context request message to the SMF.

Step 419: the SMF transmits an N4 session modification message to the UPF. UPF transmits an N4 session modification response message to SMF.

AMF transmits the tunnel information for downlink data transmission allocated by NG-RAN to UPF through SMF.

Step 420: the SMF transmits an update SM context response message to the AMF.

So far, the description of Embodiment 1 of the handover method of the present disclosure is completed. The method can resolve the problem of direct data forwarding or indirect data forwarding during the handover procedure from EN-DC to SA, especially the problem of direct data forwarding from the source SN to the target base station, ensure the coordinated work of the source master base station, source secondary base station, target base station, and core network, avoid the influence on the core network, reduce data loss, reduce data interruption time, improve the efficiency of data forwarding and ensure service continuity.

Figure 5:
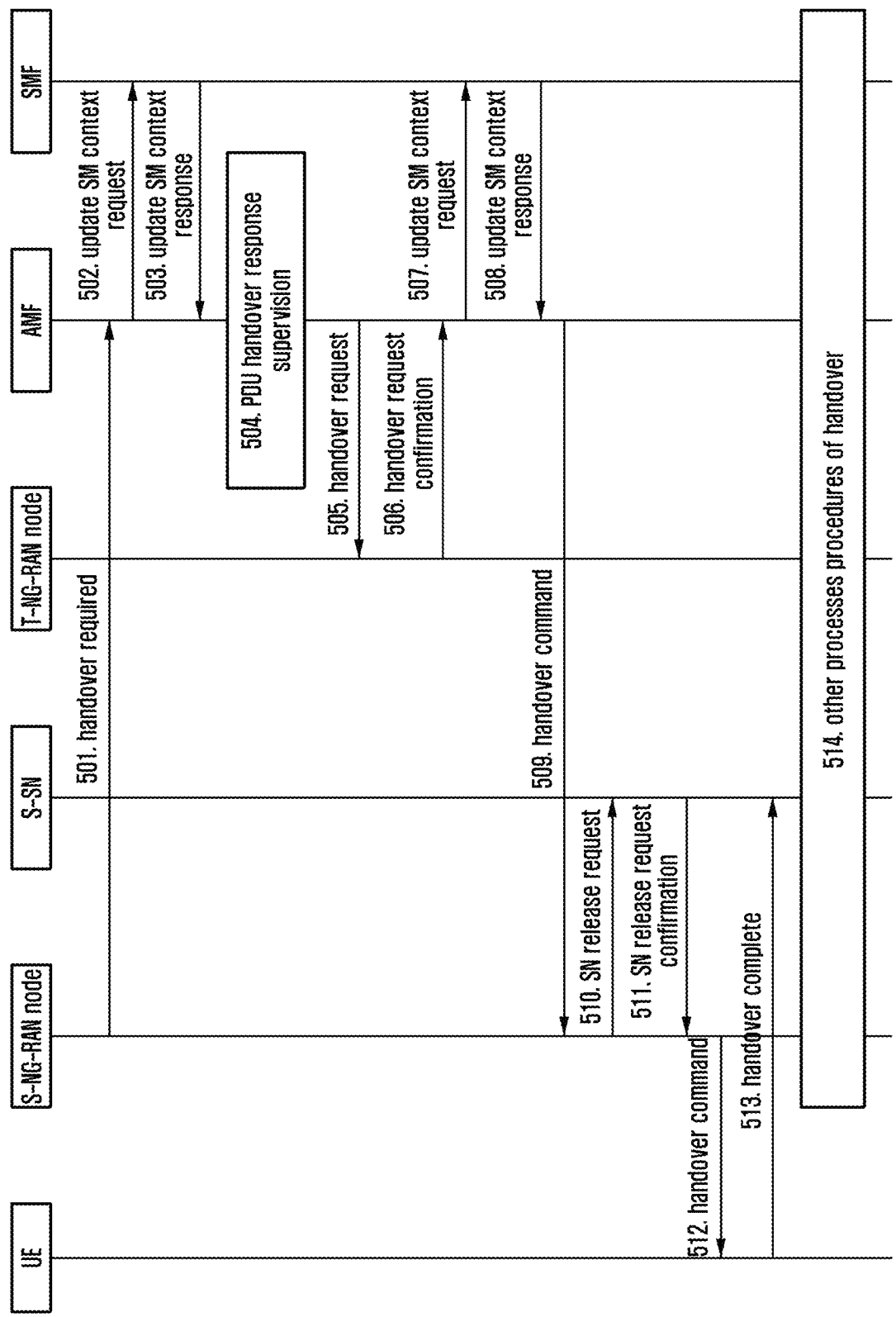
FIG. 5 illustrates a schematic diagram of Embodiment 2 of the method for supporting handover according to the present disclosure.

FIG. 5 illustrates a schematic diagram of Embodiment 2 of the method for supporting handover according to the present disclosure. This embodiment is used for handover from dual connectivity to SA in a 5G system. Detailed descriptions of steps not related to the present disclosure are omitted here. The followings steps are comprised as shown below.

Step 501: the source NG-RAN (S-NG-RAN) node decides to handover a UE to the target NG-RAN (T-NG-RAN) node. The source NG-RAN node may also be called the source base station or the source master base station. The target NG-RAN node may also be called the target base station.

The NG-RAN node here may be a gNB or an eNB connected to the 5GC or a centralized unit (CU) in the gNB. The eNB connected to the 5GC may also be referred to as ng-eNB.

The source NG-RAN node transmits a handover required message to the AMF. The message includes a source-to-target transparent container. The message includes information about the direct data forwarding path availability. When the direct data forwarding path between the source NG-RAN node and the target base station is available, the message includes the direct data forwarding path availability. The information about the direct data forwarding path availability may be included in the SM N2 information in the handover required message. The message includes the identifier of the source SN. When the message includes the information about the direct data forwarding path availability, the message includes the identifier of the source SN. The identifier of the source SN is specifically the same as in step 301 and will not be repeated here. The identifier of the source SN may be included in the source-to-target transparent container. The source-to-target transparent container here is a source NG-RAN node-to-target NG-RAN node transparent container.

The handover required message also includes information about one or more PDU session resources, the PDU session resource includes a PDU session identifier, information about one or more QoS flows included in the PDU session, a list of information about mapping from data radio bearer (DRB) to QoS flow, and/or information of whether the PDU session terminates at the master base station or the secondary base station. The information about the QoS flow also includes a QoS flow identifier, and information about downlink data forwarding and uplink data forwarding. For split PDU session, the information about the QoS flow may also include information of whether the QoS flow terminates at the master base station or the secondary base station, or the additional PDU session resources information includes information of whether the PDU session resource terminates at the master base station or the secondary base station.

The information about mapping from DRB to QoS flow includes information of whether the DRB terminates at the master base station or the secondary base station. The information about one or more PDU session resources may be included in a source-to-target transparent container, or in the handover required message, or in both the handover required message and the source-to-target transparent container. The information about one or more PDU session resources may be included in the session management (SM) container of the handover required message or in both the handover required message and the SM container of the handover required message. The source-to-target transparent container is a source NG-RAN node-to-target NG-RAN node transparent container. When the direct data forwarding path between the source target base station and the target base station is unavailable, the handover required message may include the information of whether a PDU session resource terminates at the master base station or the secondary base station, the information of whether a QoS flow terminates at the master base station or the secondary base station, and/or the information of whether a DRB terminates at the master base station or the secondary base station. If the information is directly included the handover required message, the AMF saves the received information after receiving it.

This embodiment can be used to NG handover with AMF change or NG handover without AMF change. Here, take not changing AMF as an example to explain, but it is also applicable to the scenario of changing the AMF, because the present disclosure does not change the interaction procedure between AMFs.

Step 502: the AMF transmits an update SM context request message to the SMF. The AMF transmits the message to each SMF serving the UE. The message includes the information about the direct data forwarding path availability. The information about the direct data forwarding path availability may be included in the SM N2 information transmitted by the source base station.

The message may also include information about one or more PDU session resources, and the information about the PDU session resources is the same as that in step 501, which will not be repeated here. The SMF saves the received information.

The specific procedure between SMF and UPF is omitted here.

Step 503: the SMF transmits an update SM context response message to the AMF. If the SMF does not receive the information about the direct data forwarding path availability and the SMF knows that there is no indirect data forwarding connectivity between the source and target NG-RAN node, then the N2 SM information in the SM context response message includes data forwarding not possible.

Step 504: the AMF monitors the update SM context response message from each involved SMF. When the maximum waiting time expires or the AMF receives all the update SM context response messages, the AMF continues the handover procedure.

Step 505: the AMF transmits a handover request message to the target NG-RAN node. The message includes a source-to-target transparent container. The message includes the identifier of the source SN. The identifier of the source SN may be included in the source-to-target transparent container. The source-to-target transparent container here is a source NG-RAN-to-target NG-RAN transparent container.

The message may contain information about data forwarding not possible. The information may be included in the N2 SM information container. The data forwarding not possible refers to the unfeasibility of both direct and indirect data forwarding.

Step 506: the target NG-RAN node transmits a handover request acknowledgement message to the AMF.

The message includes a target-to-source transparent container. Here, the target-to-source transparent container is a target NG-RAN node-to-source NG-RAN node transparent container.

If the target NG-RAN does not receive the data forwarding not possible, for a QoS flow accepted for data forwarding or a DRB accepted for data forwarding by the target NG-RAN, the target NG-RAN allocates the tunnel information for downlink data forwarding for the corresponding PDU session or DRB, and the allocated tunnel information for downlink data forwarding are included in the handover request acknowledgement message. For a QoS flow accepted for data forwarding, the NG-RAN allocates tunnel information for downlink data forwarding for the PDU session to which the QoS flow belongs, and the tunnel information for downlink data forwarding corresponding to the PDU session allocated by the NG-RAN is included in the handover request acknowledgement message, and a list of QoS flows accepted for data forwarding is also included in the handover request acknowledgement message. For a DRB accepted for data forwarding, the NG-RAN allocates tunnel information for downlink data forwarding to the DRB, and the DRB identifier and the downlink tunnel information for the DRB allocated by the target NG-RAN are included in the handover request acknowledgement message.

If the target NG-RAN node receives the identifier of the source SN, the target NG-RAN node determines whether the direct data forwarding path between the source SN and the target base station is available or whether direct data forwarding is feasible. If the direct data forwarding path is available, the target NG-RAN node includes the information about the direct data forwarding path availability or the direct data forwarding feasibility between the source SN and the target base station in the handover request acknowledgement message. The information may also be included in a target-to-source transparent container in the handover request acknowledgement message or may be included in both the handover request acknowledgement message and the target-to-source transparent container in the handover request acknowledgement message.

Step 507: the AMF transmits an update SM context request message to the SMF. If the tunnel information for data forwarding is received from the NG-RAN node, the AMF transmits the tunnel information for data forwarding received from the target NG-RAN node to the SMF. The tunnel information for data forwarding is the same as that in step 506, which will not be repeated here.

If the SMF receives the tunnel information for data forwarding, for indirect data forwarding, the SMF or UPF allocates the tunnel information for data forwarding from the source base station to the UPF. The tunnel information for data forwarding in the present disclosure includes the transport layer address and the tunnel identifier. If the SMF receives the direct data forwarding path availability in step 502, it is direct data forwarding. Otherwise, SMF determines in step 503 whether the indirect data forwarding is available. A detailed description of the procedure between SMF and UPF is omitted here.

If the SMF does not receive the direct forwarding path availability in step 502, the SMF receives from the target base station that the direct data forwarding path between the source SN and the target base station is available. For the PDU session or DRB that terminates at the source SN, it is direct data forwarding, and the SMF does not need to allocate the tunnel for indirect data forwarding to the PDU session or DRB, or the SMF does not need to request the UPF to allocate the tunnel for indirect data forwarding to the PDU session or DRB. For the PDU session or DRB that terminates at the source master base station, the SMF or UPF allocates the tunnel for indirect data forwarding to the PDU session or DRB. If the SMF does not receive the direct forwarding path availability in step 502, the SMF receives from the target base station that the direct data forwarding path between the source SN and the target base station is unavailable or the SMF does not receive from the target base station that the direct data forwarding path between the source SN and the target base station is available, and the SMF or UPF allocates the tunnel for indirect data forwarding. The SMF knows from the information in the message received in step 502 whether a PDU session and/or a DRB terminates at the source master base station or the secondary base station.

Step 508: the SMF transmits an update SM context response message to the AMF. The SMF transmits tunnel information used for data forwarding to the AMF. The tunnel information used for data forwarding is included in the N2 SM information. For direct data forwarding, the SMF includes the received tunnel information for data forwarding in the N2 SM information, and the tunnel information for data forwarding is allocated by the target base station. For indirect data forwarding, the SMF transmits the tunnel information for data forwarding allocated by the SMF or UPF to the AMF, and the tunnel information is used for data forwarding between the source base station and the UPF.

Corresponding to the direct data forwarding, the SMF transmits the tunnel information received from the AMF in step 507 to the AMF, the tunnel information is allocated by the target NG-RAN node. Corresponding to the indirect data forwarding, the SMF transmits the tunnel information allocated by the SMF or UPF to the AMF, and the tunnel information is used for data forwarding between the source base station (including the source master base station and the source secondary base station) and the UPF.

The message may include both the tunnel information for direct data forwarding and the tunnel information for indirect data forwarding. For example, for one or more PDU sessions or DRBs, it is the tunnel information for direct data forwarding, and for the other one or more PDU sessions or DRBs, it is the tunnel information for indirect data forwarding.

Step 509: the AMF transmits a handover command message to the source NG-RAN node. The message includes a target-to-source transparent container. The message includes the information about the direct data forwarding path availability or direct data forwarding feasibility between the source SN and the target base station, and the information may also be included in the target-to-source transparent container.

The message includes the tunnel information for data forwarding. For indirect data forwarding, the tunnel information is allocated by SMF or UPF. For direct data forwarding, the tunnel information is allocated by the target NG-RAN node. The tunnel information for data forwarding is the same as that in step 508, which will not be repeated there.

Step 510: the source NG-RAN node transmits an SN release request message to the source SN.

For bearer(s) terminated at the source SN, if the source NG-RAN node receives the tunnel information for data forwarding, and the source NG-RAN node receives the information about the direct data forwarding path availability or direct data forwarding feasibility between the source SN and the target base station or the source NG-RAN node knows the direct data forwarding path availability between the source SN and the target base station according to the configuration, the source NG-RAN node transmits the received tunnel information for data forwarding to the source SN. In this way, the source SN directly forwards the data to the target base station. If the source NG-RAN node has an interface with the target base station or the source NG-RAN node transmits direct forwarding path availability to the core network, the source NG-RAN node does not receive the information about the direct data forwarding path availability or the direct data forwarding feasibility between the source SN and the target base station, or the source NG-RAN node knows the direct data forwarding path unavailability between the source SN and the target base station according to the configuration, the source NG-RAN node allocates the tunnel information for data forwarding from the source SN to the source NG-RAN node, the source NG-RAN node transmits the allocated tunnel information for data forwarding to the source SN. For bearer(s) terminated at the source SN, the source NG-RAN node performs the above operations. In this way, the source SN forwards the data to the source NG-RAN node and transmits the data to the target base station through the source NG-RAN node. If the source NG-RAN node and the target base station have no interface or the source NG-RAN node does not transmit the direct forwarding path availability to the core network, the source NG-RAN node transmits the received tunnel for indirect data forwarding to the source SN, and the source SN forwards the data to the target base station through the core network.

Step 511: the source SN transmits an SN release request acknowledge message to the source NG-RAN node.

Step 512: the source NG-RAN node transmits a handover command message to the UE.

The source NG-RAN node forwards the data. The source NG-RAN node forwards the data to the corresponding data forwarding tunnel.

Step 513: the UE transmits a handover completion message to the target NG-RAN node.

Step 514, perform other procedures of handover.

So far, the description of Embodiment 2 of the handover method of the present disclosure is completed. This method can resolve the problem of direct data forwarding or indirect data forwarding during the handover procedure from the dual connectivity to the SA in the 5G system, especially the problem of direct data forwarding from the source SN to the target base station, ensure the coordinated work of the source master base station, source secondary base station, target base station, and core network, avoid the influence on the core network, reduce data loss, reduce data interruption time, improve the efficiency of data forwarding and ensure service continuity.

Figure 6:
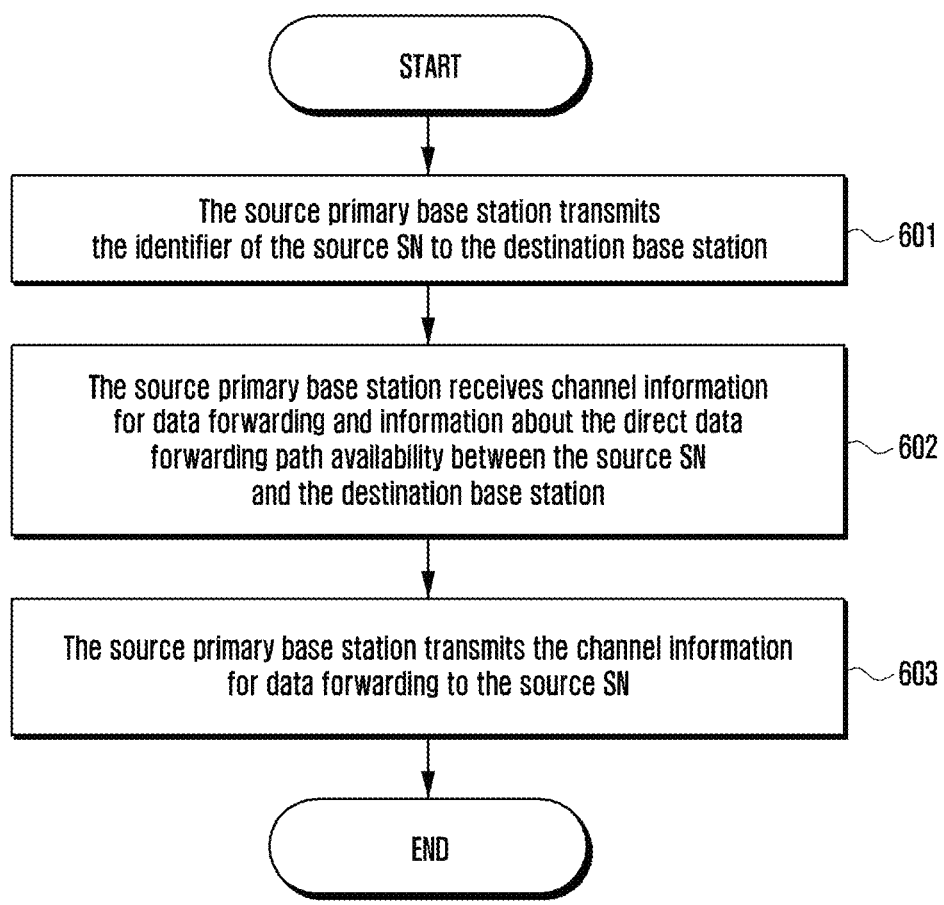
FIG. 6 illustrates a schematic diagram of a method for supporting handover described from the perspective of a source base station according to an embodiment of the present disclosure.

FIG. 6 illustrates a schematic diagram of a method for supporting handover described from the perspective of a source base station according to an embodiment of the present disclosure. This embodiment describes the method for supporting handover from the perspective of the source base station or the source master base station. This method can be used for intra-system handover or inter-system handover. The method includes the steps as shown below:

Step 601: the source master base station transmits the identifier of the source SN to the target base station. The source master base station transmits the identifier of the source SN to the target base station through the core network or directly. For NG handover or inter-system handover, the source master base station transmits a handover required message to the core network. The message includes information about the direct data forwarding path availability. When the direct data forwarding path between the source master base station and the target base station is available, or there is an interface between the source master base station and the target base station, or there is a secure interface between the source master base station and the target base station, the message includes information about the direct data forwarding path availability. The message includes the identifier of the source SN. When the message includes the information about the direct data forwarding path availability, the message includes the identifier of the source SN. The identifier of the source SN may be included in the source-to-target transparent container. The identifier of the source SN may be any identifier information that can directly or indirectly uniquely identify a base station, such as a global base station identifier or a PScell global identifier.

Step 602: the source master base station receives tunnel information for data forwarding. The tunnel information for data forwarding is included in the handover command message or the handover request acknowledgement message. The message includes the information about the direct data forwarding path availability between the source SN and the target base station. The information about the direct data forwarding path availability between the source SN and the target base station may be included in the target-to-source transparent container.

Step 603: the source master base station transmits a secondary base station release request message to the source SN. The message includes tunnel information for data forwarding. The source master base station receives the tunnel information for data forwarding. If the master source base station receives the information about the direct data forwarding path availability between the source SN and the target base station, for a bearer that terminates at the source SN, the source MN transmits the received tunnel information for data forwarding to the source SN. In this way, the source SN directly forwards the data to the target base station. If there is an interface between the source master base station and the target base station or the source master base station transmits direct forwarding path availability to the core network, the source master base station does not receive the information about the direct data forwarding path availability between the source SN and the target base station or the source master base station knows the direct data forwarding path unavailability between the source SN and the target base station according to the configuration, the source master base station allocates tunnel information for data forwarding from the source SN to the source master base station, and the source master base station transmits the allocated tunnel information for data forwarding to the source SN. For a bearer terminated at the source SN, the source master base station performs the above operations. In this way, the source SN forwards the data to the source master base station and transmits the data to the target base station through the source master base station.

So far, the description of the method for supporting handover of the present disclosure by the source base station or source master base station side is completed. The method can resolve the problem of direct data forwarding or indirect data forwarding during the handover procedure from dual connectivity to single connectivity, ensure the coordinated work of the source master base station, source secondary base station, target base station, and core network, avoid the influence on the core network, reduce data loss, reduce data interruption time, improve the efficiency of data forwarding and ensure service continuity.

Figure 7:
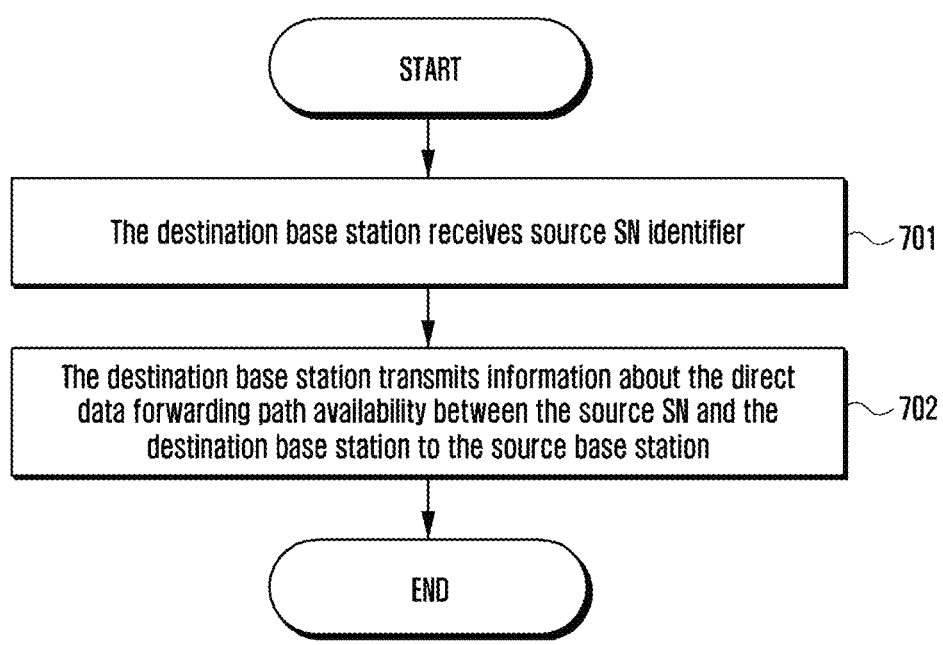
FIG. 7 illustrates a schematic diagram of a method for supporting handover described from the perspective of a target base station according to an embodiment of the present disclosure.

FIG. 7 illustrates a schematic diagram of a method for supporting handover described from the perspective of a target base station according to an embodiment of the present disclosure. This embodiment describes the method for supporting handover from the perspective of the target base station. This method can be used for intra-system handover or inter-system handover. The method includes the steps as shown below.

Step 701: the target base station receives a handover request message, where the message includes source SN identifier information. The target base station determines whether there is an interface between the source SN and the target base station, or whether there is a secure interface between the source SN and the target base station, or the direct data forwarding path between the source SN and the target base station is available, or the direct data forwarding between the source SN and the target base station is feasible. If the target base station accepts downlink data forwarding or the target base station proposes uplink data forwarding, the target base station determines whether the direct data forwarding path between the source SN and the target base station is available. The target base station allocates tunnel information for downlink data forwarding. If the target base station proposes uplink data forwarding, the target base station allocates tunnel information for uplink data forwarding.

Step 702: the target base station transmits a handover request acknowledgement message to the core network or the source base station. For NG handover or inter-system handover, the target base station transmits a handover request acknowledgement message to the core network. For handover preparation through direct interaction between two base stations (Xn handover), where Xn is the interface between two NG-RAN nodes, and the target base station transmits a handover request acknowledgement message to the source base station. The message includes the information about the direct data forwarding path availability between the source SN and the target base station. The target base station transmits the information to the source base station through the core network. The target base station transmits the information to the source base station through a handover request acknowledgement message from the target base station to the core network and a handover command message from the core network to the source base station. The target base station transmits the information to the source base station through the target-to-source transparent container in the handover request acknowledgement message and the handover command message, or the target base station directly includes the information in the handover request acknowledgement message and the handover command message. When the target base station accepts downlink data forwarding or the target base station proposes uplink data forwarding, the target base station includes the information in the handover request acknowledgement message and the handover command message.

So far, the description of the method for supporting handover of the present disclosure from the perspective of the target base station side is completed. The method can resolve the problem of direct data forwarding or indirect data forwarding during the handover procedure from dual connectivity to single connectivity, ensure the coordinated work of the source master base station, source secondary base station, target base station, and core network, avoid the influence on the core network, reduce data loss, reduce data interruption time, improve the efficiency of data forwarding and ensure service continuity.

Figure 8:
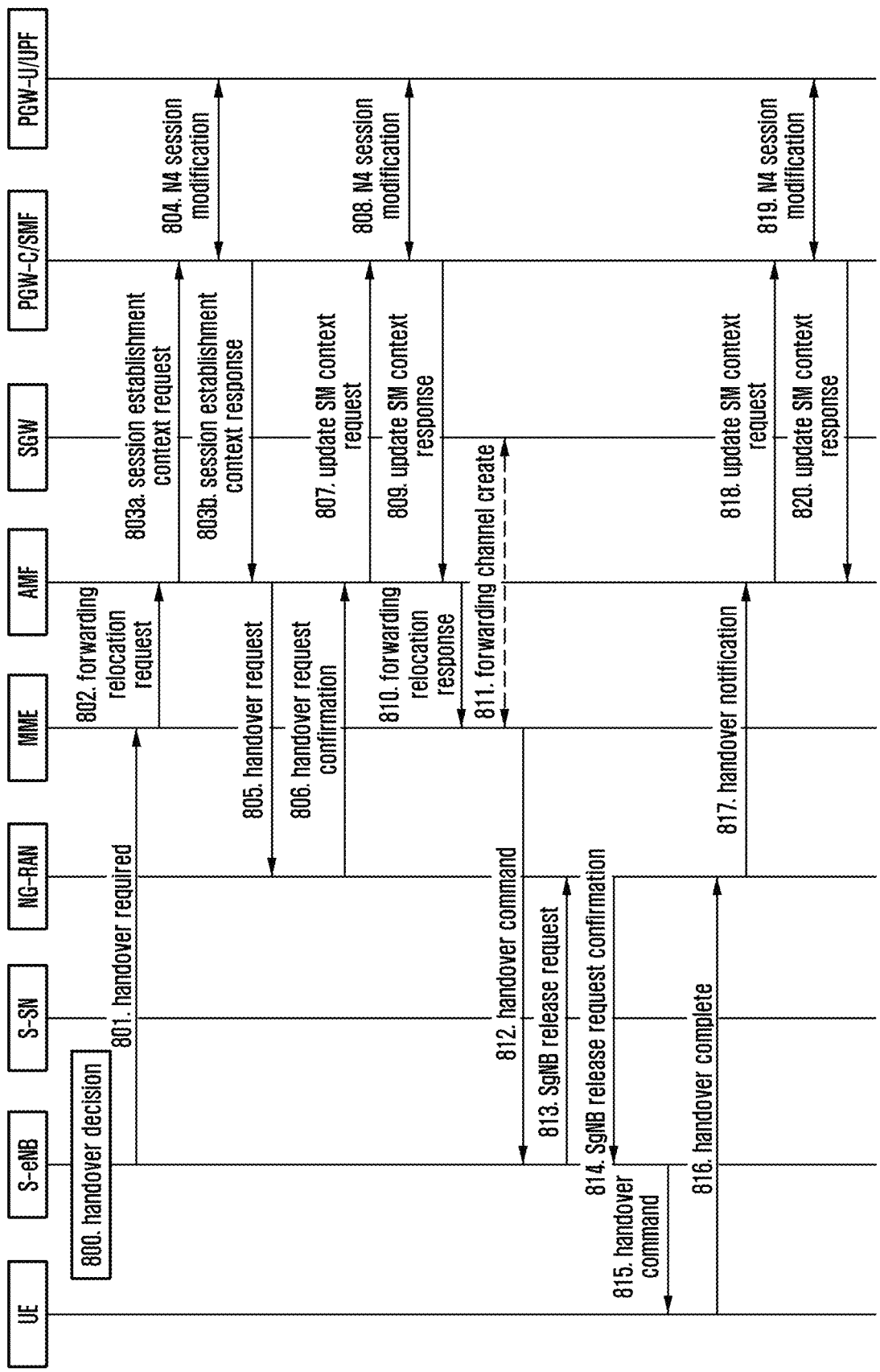
FIG. 8 illustrates a schematic diagram of the method for supporting handover according to another embodiment of the present disclosure.

FIG. 8 illustrates a schematic diagram of the method for supporting handover according to another embodiment of the present disclosure. This embodiment is used for the handover from EN-DC (EUTRA-NR dual connectivity) to standalone architecture (SA). Detailed descriptions of steps not related to the present disclosure are omitted here. The following steps are comprised as shown below.

Step 800 is the same as step 400, which will not be repeated here.

Step 801: the source eNB transmits a handover required message to the MME. The message includes a source-to-target transparent container. The message includes information about the direct data forwarding path availability. When the direct data forwarding path between the source eNB and the target base station is available, the message includes the direct data forwarding path availability. When the direct data forwarding path between the source eNB and the target base station is unavailable but the direct data forwarding path between the source SN and the target base station is available, the MME can be informed of the information in four ways as shown below.

Way 1: the message includes the direct data forwarding path availability, the handover required message includes one or multiple E-RAB information, and the E-RAB information includes an E-RAB identifier, information about downlink data forwarding, and/or information of whether the E-RAB terminates at the master base station or the secondary base station. The information of whether the E-RAB terminates at the master base station or the secondary base station can also be referred to as the information of whether the E-RAB terminates at the source master base station or the source secondary base station, and the information of whether the E-RAB terminates at the master base station or the secondary base station can be replaced with the information of whether the E-RAB terminates at the source master base station or the source secondary base station.

When the direct data forwarding path between the source eNB and the target base station is unavailable but the direct data forwarding path between the source SN and the target base station is available, the handover required message includes one or multiple E-RAB information. One or multiple E-RAB information included in handover required message can implicitly let the MME know that the direct data forwarding path availability in the handover required indicates that the direct data forwarding path between the source SN and the target base station is available.

Way 2: the message includes the source SN direct data forwarding path availability. The handover required message also includes one or multiple E-RAB information, and the E-RAB information includes an E-RAB identifier, information about downlink data forwarding, and/or information of whether the E-RAB terminates at the master base station or the secondary base station. When the direct data forwarding path between the source eNB and the target base station is unavailable but the direct data forwarding path between the source SN and the target base station is available, the handover required message includes one or multiple E-RAB information.

Way 3: the handover required message includes one or multiple E-RAB information, and the E-RAB information includes an E-RAB identifier, information about downlink data forwarding, and/or information of whether the E-RAB terminates at the master base station or the secondary base station. When the direct data forwarding path between the source eNB and the target base station is unavailable but the direct data forwarding path between the source SN and the target base station is available, the handover required message includes one or multiple E-RAB information. The handover required message can also include one or multiple E-RAB information to implicitly let the MME know that the direct data forwarding path between the source master base station and the target base station is unavailable but the direct data forwarding path between the source SN and the target base station is available.

Way 4: the handover required message includes information about one or more E-RABs that terminate at the source SN or information about one or more E-RABs that terminate at the source SN and proposed for data forwarding, and the E-RAB information includes an E-RAB identifier. When the direct data forwarding path between the source eNB and the target base station is unavailable but the direct data forwarding path between the source SN and the target base station is available, the handover required message includes one or multiple E-RAB information that terminate at the source SN or one or multiple E-RAB information that terminate at the source SN and proposed to data forwarding. The handover required message can also include one or multiple E-RAB information to implicitly let the MME know that the direct data forwarding path between the source master base station and the target base station is unavailable but the direct data forwarding path between the source SN and the target base station is available.

The one or multiple E-RAB information may be included in the source-to-target transparent container, or in the handover required message, or in both the handover required message and the source-to-target transparent container. In this embodiment, the source-to-target transparent container is a source NG-RAN node-to-target NG-RAN node transparent container. When the direct data forwarding path between the source eNB and the target base station is unavailable but the direct data forwarding path between the source SN and the target base station is available, the handover required message includes the information of whether an E-RAB terminates at the master base station or the secondary base station. If the information is directly included in the handover required message, the MME saves the information after receiving it.

The source eNB can know whether the direct data forwarding path between the source SN and the target base station is available through operation and maintenance configuration. Or the source eNB knows whether the direct data forwarding path between the source SN and the target base station is available by inquiring the source SN. For example, the source eNB sends an inquiry request message to the source SN, and the inquiry request message includes one or more target base station identifiers; the source SN sends an inquiry response message to the source eNB, and the inquiry response includes the information about availability of the direct forwarding path between the source SN and a target base station in the inquiry request message. If the request message includes multiple target base stations, the inquiry response message includes the information about availability of the direct forwarding path between the source SN and each target base station.

Step 802: the MME transmits a forwarding relocation request message to the AMF.

The message includes one or multiple E-RAB information, and the E-RAB information is the same as that in step 801, which will not be repeated here.

The MME transmits a direct forwarding indication to the AMF. The direct forwarding indication may indicate direct data forwarding or indirect data forwarding. The direct forwarding indication may also be called a direct forwarding flag. If the MME does not receive the direct data forwarding path availability from the source eNB, the MME decides whether indirect data forwarding is available. The MME informs the AMF of the direct data forwarding or indirect data forwarding. The MME may also inform the AMF that data forwarding is not possible, wherein the data forwarding not possible means that direct data forwarding and indirect data forwarding are both not possible. Alternatively, the MME can also inform the AMF of the information about direct data forwarding availability.

Steps 803a to 803b are the same as steps 403a to 403b, which will not be repeated here.

Step 805: the AMF transmits a handover request message to the NG-RAN. The message includes a source-to-target transparent container.

The message may also include one or multiple E-RAB information, and the E-RAB information is the same as that in step 801, which will not be repeated here. The one or multiple E-RAB information may be contained in the source-to-target transparent container.

The message includes information about the direct data forwarding path availability or source SN direct data forwarding path availability or data forwarding not possible. The information may be included in the N2 SM information container. The data forwarding not possible refers to the unavailability of direct data forwarding and indirect data forwarding.

The message may also include the mapping between a QoS flow and an EPS bearer in the PDU session, that is, the E-RAB identifier mapped by a QoS flow and/or the mapped QoS information.

Step 806: the NG-RAN transmits a handover request acknowledgement message to the AMF.

The message includes a target-to-source transparent container. Here, the target-to-source transparent container is a target NG-RAN node-to-source NG-RAN node transparent container.

If the target NG-RAN node receives the direct data forwarding path availability, the direct data forwarding can be used. If it is direct data forwarding, for a QoS flow accepted for data forwarding or a E-RAB accepted for data forwarding by the NG-RAN node, the NG-RAN node allocates tunnel information for downlink data forwarding for the corresponding E-RAB, the E-RAB identifier and the downlink tunnel information corresponding to the E-RAB allocated by the NG-RAN are included in the handover request acknowledgement message. If it is indirect data forwarding, for a QoS flow accepted for data forwarding, the NG-RAN node allocates tunnel information for downlink data forwarding for the PDU session to which the QoS flow belongs, and the PDU session identifier and the downlink tunnel information corresponding to the PDU session allocated by the NG-RAN are included in the handover request acknowledgement message, and a list of QoS flows accepted data forwarding is also included in the handover request acknowledgement message. If data forwarding is not possible, the NG-RAN node does not need to allocate tunnel information for data forwarding.

If the target NG-RAN node receives the information of whether the E-RAB terminates at the master base station or the secondary base station, and/or the direct data forwarding path availability, and/or the source SN direct data forwarding path availability, for the E-RAB that terminates at the source master base station, if the target base stations accepts data forwarding, the target NG-RAN node allocates tunnel information for downlink data forwarding for the PDU session to which one or more QoS flows mapped to the E-RAB belong. For the E-RAB that terminates at the source SN, the target NG-RAN node allocates tunnel information for downlink data forwarding to the corresponding E-RAB.

The handover request acknowledgement message includes the tunnel information for downlink data forwarding allocated by the target NG-RAN node. The tunnel information for downlink data forwarding may be for each E-RAB or for each PDU session or includes tunnel information for data forwarding for E-RAB and tunnel information for data forwarding for PDU session at the same time. For the tunnel information for data forwarding for E-RAB, the message further includes the corresponding E-RAB identifier. For the tunnel information for data forwarding for PDU session, the message further includes a PDU session identifier.

Step 807: the AMF transmits an update SM context request message to the SMF. If the tunnel information for data forwarding is received from the NG-RAN, the AMF transmits the tunnel information for data forwarding received from the NG-RAN to the SMF. The AMF transmits the tunnel information used for data forwarding received from NG-RAN to SMF. The tunnel information for data forwarding is the same as that in step 806, which will not be repeated here.

If SMF receives the tunnel information for data forwarding for the corresponding E-RAB, it is direct data forwarding. If SMF receives the tunnel information for data forwarding for the corresponding PDU session, it is indirect data forwarding. If there is no tunnel information for data forwarding, the data forwarding is not possible or the data forwarding is not accepted by the target base station.

Step 808 is the same as step 408, which will not be repeated here.

Step 809: the SMF transmits an update SM context response message to the AMF. The SMF transmits tunnel information for data forwarding to AMF. For direct data forwarding, the SMF transmits the tunnel information for each E-RAB received from the AMF in step 407 to the AMF, and the tunnel information for each E-RAB is allocated by the target NG-RAN. For indirect data forwarding, the SMF transmits the tunnel information of each E-RAB allocated by the SMF or UPF to the AMF, and the tunnel information is used for data forwarding between the SGW and the UPF.

If the SMF receives the tunnel for data forwarding for E-RAB and the tunnel for data forwarding for PDU session at the same time in step 807, the tunnel for data forwarding for E-RAB is used for direct data forwarding from the source base station (the source master base station and/or the source secondary base station) to the target base station, and the tunnel for data forwarding for PDU session is used for data forwarding from the UPF to the target base station in the indirect data forwarding. Corresponding to the tunnel for data forwarding for PDU session, the SMF or UPF allocates the tunnel for indirect data forwarding for each E-RAB between the SGW and the UPF. Corresponding to the direct data forwarding, the SMF transmits the tunnel information for each E-RAB received from the AMF in step 807 to the AMF, the tunnel information for each E-RAB is allocated by the target NG-RAN node, and the E-RAB information further includes direct data forwarding indication. Corresponding to the indirect data forwarding, the SMF transmits the tunnel information of each E-RAB allocated by the SMF or UPF to the AMF, the tunnel information is used for data forwarding between the SGW and the UPF, and the E-RAB information further includes indirect data forwarding indication. The message transmitted by the SMF to the AMF includes indication information of whether each tunnel for data forwarding is for direct data forwarding or indirect data forwarding. The tunnel for data forwarding is for each E-RAB.

Step 810 is the same as step 410, which will not be repeated here.

Step 811: if the MME receives the tunnel information for data forwarding, for indirect data forwarding, the MME transmits an indirect data forwarding tunnel establishment request message to the SGW. The message is used to transmit tunnel information for data forwarding between the SGW and the UPF to the SGW. The SGW transmits an indirect data forwarding tunnel establishment response message to the MME. The message includes the uplink tunnel information allocated by the SGW for data forwarding on the S1 interface. For direct data forwarding, this step does not need to be performed. The MME knows whether to use direct data forwarding or indirect data forwarding according to the information about the direct data forwarding path availability received from the source base station, specifically as described in step 802.

If the MME receives the information of whether an E-RAB terminates at the master base station or the secondary base station, and/or the direct data forwarding path availability, and/or the source SN direct data forwarding path availability, for the E-RAB(s) that terminates at the source master base station, the MME requests the SGW to allocate the tunnel for indirect data forwarding, and for the E-RAB(s) that terminates at the source secondary base station, the MME does not need to request the SGW to allocate the tunnel for indirect data forwarding. For the E-RAB(s) that the tunnel for data forwarding is received from the AMF, the MME performs the above operations.

If the MME receives the indication information of whether each tunnel for data forwarding is for direct data forwarding or indirect data forwarding, for the tunnel for direct data forwarding, the MME does not need to request the SGW to allocate a tunnel for indirect data forwarding, and for the tunnel for indirect data forwarding, the MME requests the SGW to allocate a tunnel for indirect data forwarding.

Step 812: the MME transmits a handover command message to the source eNB.

The message includes the tunnel information for data forwarding. For indirect data forwarding, the tunnel information is allocated by the SGW. For direct data forwarding, the tunnel information is allocated by the target NG-RAN node. The message may include both the tunnel information for direct data forwarding allocated by the target NG-RAN node and the tunnel information for indirect data forwarding allocated by the SGW at the same time. The tunnel for data forwarding is for each E-RAB.

Step 813: the source eNB transmits an SgNB release request message to the source SN.

For bearer(s) terminated at the source SN, if the source base station receives the tunnel information for data forwarding, and the direct data forwarding path between the source SN and the target base station is available, the source MN transmits the received tunnel information for data forwarding to the source SN. In this way, the source SN directly forwards the data to the target base station. The source base station knows that the direct data forwarding path between the source SN and the target base station is available according to the configuration or according to inquiring the source SN, and the details are the same as in step 801, which will not be repeated here.

If there is an interface between the source MN and the target base station or the source MN transmits the direct forwarding path availability to the core network, and the direct data forwarding between the source SN and the target base station is unavailable, the source MN allocates the tunnel information for data forwarding from the source SN to the source MN, and the source MN transmits the allocated tunnel information for data forwarding to the source SN. For the bearer(s) terminated at the source SN, the source MN performs the above operations. In this way, the source SN forwards the data to the source MN, and to the target base station through the source MN. If the source MN and the target base station have no interface or the source MN does not transmit the direct forwarding path availability to the core network, the source MN node transmits the received tunnel for indirect data forwarding to the source SN, and the source SN forwards the data to the target base station through the core network.

Steps 814 to 819 are the same as steps 414 to 419, which will not be repeated here.

So far, the description of another embodiment of the handover method of the present disclosure is completed. The method can resolve the problem of direct data forwarding or indirect data forwarding during the handover procedure from EN-DC to SA, especially the problem of direct data forwarding from the source SN to the target base station, ensure the coordinated work of the source master base station, source secondary base station, target base station, and core network, avoid the influence on the core network, reduce data loss, reduce data interruption time, improve the efficiency of data forwarding and ensure service continuity.

Figure 9:
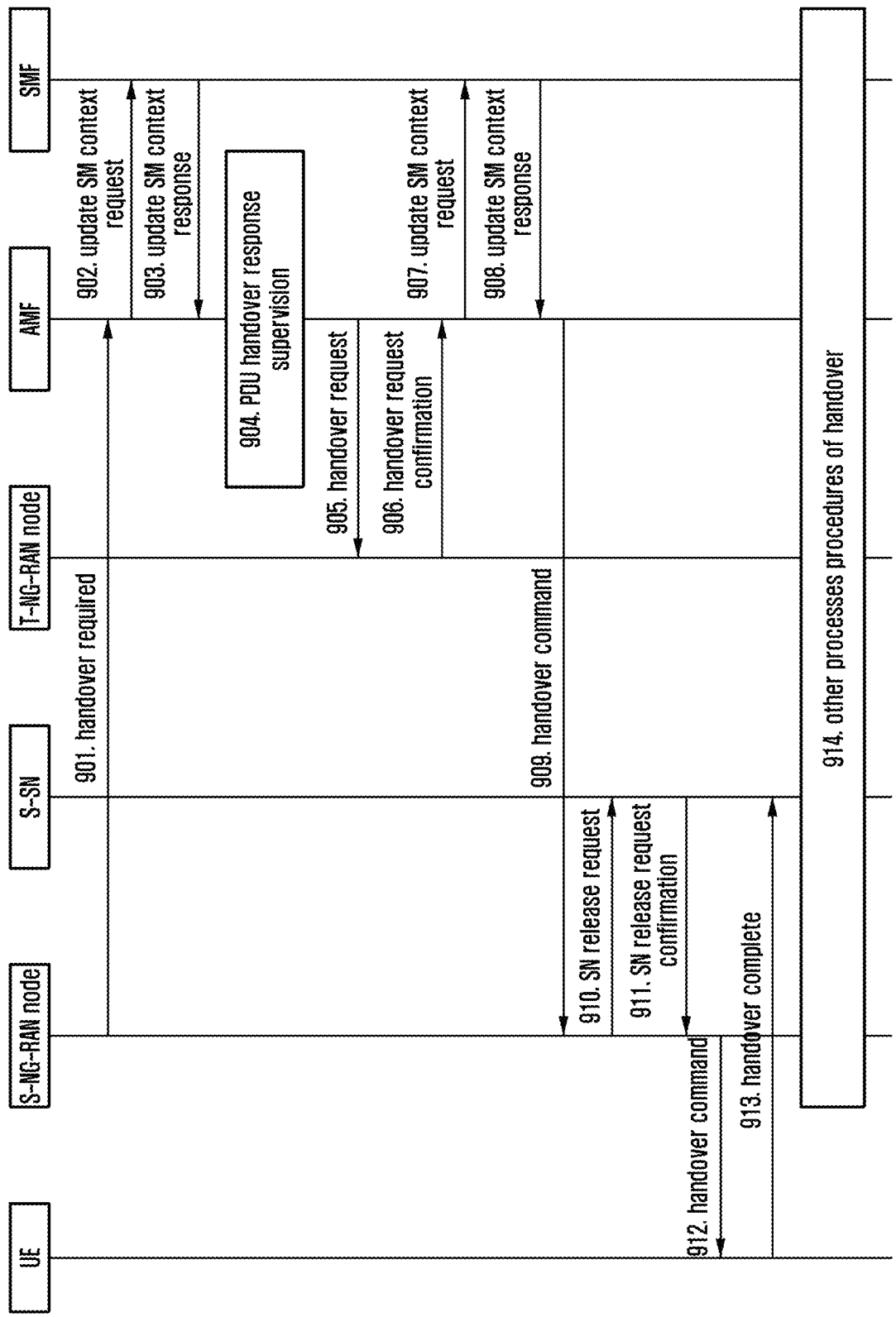
FIG. 9 illustrates a schematic diagram of the method for supporting handover according to another embodiment of the present disclosure.

FIG. 9 illustrates a schematic diagram of the method for supporting handover according to another embodiment of the present disclosure. This embodiment is used for handover from dual connectivity to SA in a 5G system. Detailed descriptions of steps not related to the present disclosure are omitted here. The followings steps are comprised as shown below.

Step 901: the source NG-RAN (S-NG-RAN) node decides to handover a UE to the target NG-RAN (T-NG-RAN) node. The source NG-RAN node may also be called the source base station or the source master base station. The target NG-RAN node may also be called the target base station.

The NG-RAN node here may be a gNB or an eNB connected to the 5GC or a centralized unit (CU) in the gNB. The eNB connected to the 5GC may also be referred to as ng-eNB.

The source NG-RAN node transmits a handover required message to the AMF. The message includes a source-to-target transparent container. The message includes information about the direct data forwarding path availability. When the direct data forwarding path between the source NG-RAN node and the target base station is available, the message includes the direct data forwarding path availability. The information about the direct data forwarding path availability may be included in the SM N2 information in the handover required message.

The handover required message also includes information about one or more PDU session resources, the PDU session resource includes a PDU session identifier, information about one or more QoS flows included in the PDU session, a list of information about mapping from data radio bearer (DRB) to QoS flow, and/or information of whether the PDU session terminates at the master base station or the secondary base station. The information about the QoS flow also includes a QoS flow identifier, and information about downlink data forwarding and uplink data forwarding. For split PDU sessions, the information about the QoS flow may also include information of whether the QoS flow terminates at the master base station or the secondary base station, or the additional PDU session resources information includes information of whether the PDU session resource terminates at the master base station or the secondary base station.

The information of whether a QoS flow terminates at the master base station or the secondary base station can also be referred to as the information of whether a QoS flow terminates at the source master base station or the source secondary base station, and it is the same in the following. The information about mapping from DRB to QoS flow includes information of whether the DRB terminates at the master base station or the secondary base station. The information of whether the DRB terminates at the master base station or the secondary base station can also be referred to as the information of whether the DRB terminates at the source master base station or the source secondary base station, and it is the same in the following. The information about one or more PDU session resources may be included in a source-to-target transparent container, or in the handover required message, or in both the handover required message and the source-to-target transparent container. The information about one or more PDU session resources may be included in the session management (SM) container of the handover required message or in both the handover required message and the SM container of the handover required message.

The source-to-target transparent container is a source NG-RAN node-to-target NG-RAN node transparent container. When the direct data forwarding path between the source master base station and the target base station is unavailable, or when the direct data forwarding path between the source master base station and the target base station is unavailable but the direct data forwarding path between the source SN and the target base station is available, the handover required message may include the information of whether a PDU session resource terminates at the master base station or the secondary base station, the information of whether a QoS flow terminates at the master base station or the secondary base station, and/or the information of whether a DRB terminates at the master base station or the secondary base station. The AMF saves the received information after receiving it. When the direct data forwarding path between the source master base station and the target base station is unavailable but the direct data forwarding path between the source SN and the target base station is available, the AMF and/or the SMF can be informed of the information in four ways as shown below.

Way 1: the message includes the direct data forwarding path availability, the handover required message includes one or multiple information about the PDU session resources, see the description above. When the direct data forwarding path between the source master base station and the target base station is unavailable but the direct data forwarding path between the source SN and the target base station is available, the handover required message includes one or multiple information about the PDU session resources. The handover required message can also include one or multiple PDU session resources information to implicitly let the AMF and/or the SMF know that the direct data forwarding path availability indicates that the direct data forwarding path between the source SN and the target base station is available.

Way 2: the message includes the source SN direct data forwarding path availability. The handover required message also includes one or multiple PDU session resources information. When the direct data forwarding path between the source master base station and the target base station is unavailable but the direct data forwarding path between the source SN and the target base station is available, the handover required message also includes one or multiple PDU session resources information.

Way 3: the handover required message includes one or multiple PDU session resources information. When the direct data forwarding path between the source master base station and the target base station is unavailable but the direct data forwarding path between the source SN and the target base station is available, the handover required message also includes one or multiple PDU session resources information. The handover required message can also include one or multiple PDU session resources information to implicitly let the AMF and/or the SMF know that the direct data forwarding path between the source master base station and the target base station is unavailable but the direct data forwarding path between the source SN and the target base station is available.

Way 4: the handover required message includes information about one or more PDU session resources and/or DRBs that terminate at the source SN, or information about one or more PDU session resources that terminate at the source SN and the PDU session resources include a QoS flow or a DRB proposed for data forwarding, the information included in the PDU session resources is the same as above. When the direct data forwarding path between the source master base station and the target base station is unavailable but the direct data forwarding path between the source SN and the target base station is available, the handover required message includes the information about one or more PDU session resources and/or DRBs. The handover required message may also include the information about one or more PDU session resources to implicitly let the AMF and/or the SMF know that the direct data forwarding path between the source master base station and the target base station is unavailable but the direct data forwarding path between the source SN and the target base station is available.

This embodiment can be used to NG handover with AMF change or NG handover without AMF change. Here, take not changing AMF as an example to explain, but it is also applicable to the scenario of changing the AMF, because the present disclosure does not change the interaction procedure between AMFs.

Step 902: the AMF transmits an update SM context request message to the SMF. The AMF transmits the message to each SMF serving the UE. The message includes the information about the direct data forwarding path availability. The information about the direct data forwarding path availability may be included in the SM N2 information transmitted by the source base station.

The message may also include information about one or more PDU session resources, and the information about the PDU session resources is the same as that in step 901, which will not be repeated here. The SMF saves the received information.

The specific procedure between SMF and UPF is omitted here.

Steps 903 to 904 are the same as steps 503 to 504, which will not be repeated here.

Step 905: the AMF transmits a handover request message to the target NG-RAN node. The message includes a source-to-target transparent container. The message may contain information about data forwarding not possible. The information may be included in the N2 SM information container. The data forwarding not possible refers to the unfeasibility of both direct and indirect data forwarding.

Step 906: the target NG-RAN node transmits a handover request acknowledgement message to the AMF.

The message includes a target-to-source transparent container. Here, the target-to-source transparent container is a target NG-RAN node-to-source NG-RAN node transparent container.

If the target NG-RAN does not receive the data forwarding not possible, for a QoS flow accepted for data forwarding or a DRB accepted for data forwarding by the target NG-RAN, the target NG-RAN allocates the tunnel information for downlink data forwarding for the corresponding PDU session or DRB, and the allocated tunnel information for downlink data forwarding are included in the handover request acknowledgement message. For a QoS flow accepted for data forwarding, the NG-RAN allocates tunnel information for downlink data forwarding for the PDU session to which the QoS flow belongs, and the tunnel information for downlink data forwarding corresponding to the PDU session allocated by the NG-RAN is included in the handover request acknowledgement message, and a list of QoS flows accepted for data forwarding is also included in the handover request acknowledgement message. For a DRB accepted for data forwarding, the NG-RAN allocates tunnel information for downlink data forwarding to the DRB, and the DRB identifier and the downlink tunnel information for the DRB allocated by the target NG-RAN are included in the handover request acknowledgement message.

Step 907: the AMF transmits an update SM context request message to the SMF. If the tunnel information for data forwarding is received from the NG-RAN node, the AMF transmits the tunnel information for data forwarding received from the target NG-RAN node to the SMF. The tunnel information for data forwarding is the same as that in step 906, which will not be repeated here.

If the SMF receives the tunnel information for data forwarding, for indirect data forwarding, the SMF or UPF allocates the tunnel information for data forwarding from the source base station to the UPF. The tunnel information for data forwarding in the present disclosure includes the transport layer address and the tunnel identifier. If the SMF receives the direct data forwarding path availability in step 902, it is direct data forwarding. Otherwise, SMF determined in step 903 whether the indirect data forwarding is available. A detailed description of the procedure between SMF and UPF is omitted here.

If the SMF receives the information of whether a PDU session resources terminate at the master base station or the secondary base station, and/or the direct data forwarding path availability, and/or the source SN direct data forwarding path availability, for a PDU session resource or a DRB that terminate at the source master base station, the SMF allocates or the SMF requests the UPF to allocate the tunnel for indirect data forwarding; for a PDU session resource or a DRB that terminate at the source secondary base station, the SMF does not need to allocate the tunnel for indirect data forwarding to the PDU session resource or DRB, or the SMF does not need to request the UPF to allocate the tunnel for indirect data forwarding to the PDU session resource or DRB. For the PDU session resources or DRBs that the data forwarding tunnel is received from the AMF, the SMF performs the above operations.

If the SMF receives the indication information of whether each tunnel for data forwarding is for direct data forwarding or indirect data forwarding, for the tunnel for direct data forwarding, the SMF does not need to allocate the tunnel for indirect data forwarding to the PDU session resources or DRBs, or the SMF does not need to request the UPF to allocate the tunnel for indirect data forwarding to the PDU session resources or DRBs; for the tunnel for indirect data forwarding, the SMF allocates or the SMF requests the UPF to allocate the tunnel for indirect data forwarding to the PDU session resources or DRBs.

Step 908: the SMF transmits an update SM context response message to the AMF. The SMF transmits tunnel information used for data forwarding to the AMF. The tunnel information used for data forwarding is included in the N2 SM information. For direct data forwarding, the SMF includes the received tunnel information for data forwarding in the N2 SM information, and the tunnel information for data forwarding is allocated by the target base station. For indirect data forwarding, the SMF transmits the tunnel information for data forwarding allocated by the SMF or UPF to the AMF, and the tunnel information is used for data forwarding between the source base station and the UPF.

Corresponding to the direct data forwarding, the SMF transmits the tunnel information received from the AMF in step 507 to the AMF, the tunnel information is allocated by the target NG-RAN node. Corresponding to the indirect data forwarding, the SMF transmits the tunnel information allocated by the SMF or UPF to the AMF, and the tunnel information is used for data forwarding between the source base station (including the source master base station and the source secondary base station) and the UPF.

The message may include both the tunnel information for direct data forwarding and the tunnel information for indirect data forwarding. For example, for one or more PDU sessions or DRBs, it is the tunnel information for direct data forwarding, and for the other one or more PDU sessions or DRBs, it is the tunnel information for indirect data forwarding.

Step 909: the AMF transmits a handover command message to the source NG-RAN node. The message includes a target-to-source transparent container.

The message includes the tunnel information for data forwarding. For indirect data forwarding, the tunnel information is allocated by SMF or UPF. For direct data forwarding, the tunnel information is allocated by the target NG-RAN node. The tunnel information for data forwarding is the same as that in step 908, which will not be repeated there.

Step 910: the source NG-RAN node transmits an SN release request message to the source SN.

For bearer(s) terminated at the source SN, if the source NG-RAN node receives the tunnel information for data forwarding, and the direct data forwarding path between the source SN and the target base station is available, the source NG-RAN node transmits the received tunnel information for data forwarding to the source SN. In this way, the source SN directly forwards the data to the target base station. The source base station knows that the direct data forwarding path between the source SN and the target base station is available according to the configuration or according to inquiring the source SN, and the details are the same as in step 801, which will not be repeated here.

If there is an interface between the source NG-RAN node and the target base station or the source NG-RAN node transmits the direct forwarding path availability to the core network, and the direct data forwarding between the source SN and the target base station is unavailable, the source NG-RAN node allocates the tunnel information for data forwarding from the source SN to the source NG-RAN node, and the source NG-RAN node transmits the allocated tunnel information for data forwarding to the source SN. For the bearer(s) terminated at the source SN, the source NG-RAN node performs the above operations. In this way, the source SN forwards the data to the source NG-RAN node, and to the target base station through the source NG-RAN node. If the source NG-RAN node and the target base station have no interface or the source NG-RAN does not transmit the direct forwarding path availability to the core network, the source NG-RAN node transmits the received tunnel for indirect data forwarding to the source SN, and the source SN forwards the data to the target base station through the core network.

Steps 911 to 914 are the same as steps 511 to 514, which will not be repeated here.

So far, the description of another embodiment of the handover method of the present disclosure is completed. The method can resolve the problem of direct data forwarding or indirect data forwarding during the handover procedure from EN-DC to SA, especially the problem of direct data forwarding from the source SN to the target base station, ensure the coordinated work of the source master base station, source secondary base station, target base station, and core network, avoid the influence on the core network, reduce data loss, reduce data interruption time, improve the efficiency of data forwarding and ensure service continuity.

Figure 10:
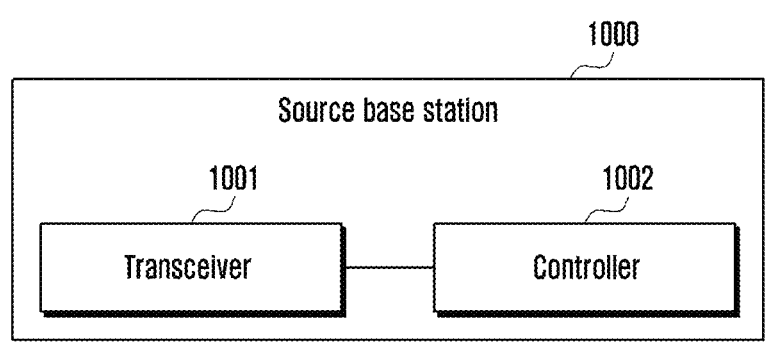
FIG. 10 illustrates a block diagram of a source base station supporting a handover method according to an embodiment of the present disclosure.

FIG. 10 illustrates a block diagram of a source base station supporting a handover method according to an embodiment of the present disclosure.

Referring to FIG. 10, the source base station 1000 may include a transceiver 1001 and a controller 1002.

The transceiver 1001 may be configured to transmit the identifier of the source SN to the target base station, receive tunnel information for data forwarding, and transmit the secondary base station release request message to the source SN.

The controller 1002 may be a circuit-specific integrated circuit or at least one processor. The controller 1002 may be configured to control the overall operation of the source base station and control the source base station to implement the method provided in the present disclosure. Specifically, the controller 1002 may be configured to control the transceiver 1001 to transmit the identifier of the source SN to the target base station, receive tunnel information for data forwarding, and transmit a secondary base station release request message to the source SN.

So far, the description of the source base station or source master base station supporting the handover method of the present disclosure is completed. By using the source base station or the source master base station, the problem of direct data forwarding or indirect data forwarding during the handover procedure from dual connectivity to single connectivity can be resolved, ensure the coordinated work of the source master base station, source secondary base station, target base station, and core network, avoid the influence on the core network, reduce data loss, reduce data interruption time, improve the efficiency of data forwarding and ensure service continuity.

Figure 11:
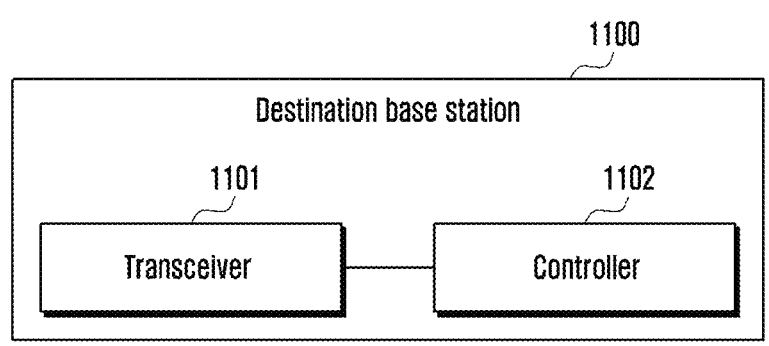
FIG. 11 illustrates a block diagram of a target base station supporting a handover method according to an embodiment of the present disclosure.

FIG. 11 shows a block diagram of a target base station supporting a handover method according to an embodiment of the present disclosure.

Referring to FIG. 11, the target base station 1100 may include a transceiver 1101 and a controller 1102.

The transceiver 1101 may be configured to receive the source secondary base station identifier from the source master base station and transmit to the source master base station information about the direct data forwarding path availability between the source secondary base station and the target base station.

The controller 1102 may be a circuit-specific integrated circuit or at least one processor. The controller 1102 may be configured to control the overall operation of the target base station and control the target base station to implement the method provided in the present disclosure. Specifically, the controller 1102 may be configured to control the transceiver 1101 to receive the source secondary base station identifier from the source master base station and transmit the information about the direct data forwarding path availability between the source secondary base station and the target base station to the source master base station.

So far, the description of the target base station supporting the handover method of the present disclosure is completed. By using the target base station, the problem of direct data forwarding or indirect data forwarding during the handover procedure from dual connectivity to single connectivity can be resolved, ensure the coordinated work of the source master base station, source secondary base station, target base station, and core network, avoid the influence on the core network, reduce data loss, reduce data interruption time, improve the efficiency of data forwarding and ensure service continuity.

Those skilled in the art will understand that the various illustrative logical blocks, modules, circuits, and steps described in this application can be implemented as hardware, software, or a combination of both. In order to clearly illustrate the interchangeability of hardware and software, various illustrative components, blocks, modules, circuits, and steps are generally described above in the form of their function sets. Whether such a feature set is implemented as hardware or software depends on the specific application and design constraints imposed on the overall system. Technicians can implement the described function set in different ways for each specific application, but such design decisions should not be construed as causing a departure from the scope of this application.

The various illustrative logic blocks, modules, and circuits described in this application may be general-purpose processors, digital signal processors (DSP), application-specific integrated circuits (ASIC), field programmable gate arrays (FPGA) or other programmable logic devices, discrete gate or transistor logic, discrete hardware components, or any combination thereof designed to perform the functions described herein are implemented or executed. A general-purpose processor may be a microprocessor, but in the alternative, the processor may be any conventional processor, controller, microcontroller, or state machine. The processor may also be implemented as a combination of computing devices, such as a combination of a DSP and a microprocessor, multiple microprocessors, one or more microprocessors in cooperation with a DSP core, or any other such configuration.

The steps of the method or algorithm described in this application can be directly embodied in hardware, in a software module executed by a processor, or in a combination of the two. The software module may reside in RAM memory, flash memory, ROM memory, EPROM memory, EEPROM memory, registers, hard disk, removable disk, or any other form of storage medium known in the art. An exemplary storage medium is coupled to the processor such that the processor can read information from the storage medium and write information to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

In one or more exemplary designs, the functions described may be implemented in hardware, software, firmware, or any combination thereof. If implemented in software, each function can be stored as one or more indications or codes on a computer-readable medium or transmitted through it. Computer readable media include both computer storage media and communication media, the latter including any media that facilitates the transfer of a computer program from one place to another. The storage medium may be any available medium that can be accessed by a general-purpose or special-purpose computer.

The embodiments of this application are only for ease of description and help comprehensive understanding of this application, and are not intended to limit the scope of this application. Therefore, it should be understood that, except for the embodiments disclosed herein, all modifications and changes or forms of modifications and changes derived from the technical idea of the present application fall within the scope of the present application.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first node in a mobile communication system, the method comprising:
  determining whether a direct data forwarding path between the first node and a third node is available;
  transmitting a handover required message including an identifier of a second node performing a dual connectivity operation with the first node and information indicating whether the direct data forwarding path between the first node and the third node is available based on the determination; and receiving a handover command message including information indicating whether a direct data forwarding path between the second node and the third node is available.

2. The method of claim 1, wherein the identifier of the second node is included in a source to target transparent container within the handover required message.

3. The method of claim 1, wherein the information indicating whether the direct data forwarding path between the second node and the third node is available is included in a target to source transparent container within the handover command message.

4. The method of claim 1, wherein data forwarding from the second node to the third node is performed according to the direct data forwarding path between the second node and the third node.

5. The method of claim 1, wherein the identifier of the second node is used for handover from evolved universal terrestrial radio access (E-UTRA)-new radio (NR) dual connectivity (EN-DC) to stand alone (SA).

6. A method performed by a third node in a mobile communication system, the comprising:

receiving a handover request message including an identifier of a second node performing a dual connectivity operation with a first node;

determining whether a direct data forwarding path between the third node and the second node is available based on the identifier of the second node; and transmitting a handover request acknowledgment message including information indicating whether a direct data forwarding path between the second node and the third node is available based on the determination.

7. The method of claim 6, wherein the identifier of the second node is included in a source to target transparent container within the handover request message.

8. The method of claim 6, wherein the information indicating whether the direct data forwarding path between the second node and the third node is available is included in a target to source transparent container within the handover request acknowledgment message.

9. The method of claim 6, wherein data forwarding from the second node to the third node is performed according to the direct data forwarding path between the second node and the third node.

10. The method of claim 6, wherein the identifier of the second node is used for handover from evolved universal terrestrial radio access (E-UTRA)-new radio (NR) dual connectivity (EN-DC) to stand alone (SA).

11. A first node in a mobile communication system, the first node comprising:

a transceiver; and a controller coupled with the transceiver and configured to:

determine whether a direct data forwarding path between the first node and a third node is available, transmit, via the transceiver, a handover required message including an identifier of a second node performing a dual connectivity operation with the first node and information indicating whether the direct data forwarding path between the first node and the third node is available based on the determination, and receive, via the transceiver, a handover command message including information indicating whether a direct data forwarding path between the second node and the third node is available.

12. The first node of claim 11, wherein the identifier of the second node is included in a source to target transparent container within the handover required message.

13. The first node of claim 11, wherein the information indicating whether the direct data forwarding path between the second node and the third node is available is included in a target to source transparent container within the handover command message.

14. The first node of claim 11, wherein data forwarding from the second node to the third node is performed according to the direct data forwarding path between the second node and the third node.

15. The first node of claim 14, wherein the identifier of the second node is used for handover from evolved universal terrestrial radio access (E-UTRA)-new radio (NR) dual connectivity (EN-DC) to stand alone (SA).

16. A third node in a mobile communication system, the third node comprising:

a transceiver; and a controller coupled with the transceiver and configured to:

receive, via the transceiver, a handover request message including an identifier of a second node performing a dual connectivity operation with a first node, determining whether a direct data forwarding path between the third node and the second node is available based on the identifier of the second node, and transmit, via the transceiver, a handover request acknowledgment message including information indicating whether a direct data forwarding path between the second node and the third node is available based on the determination.

17. The third node of claim 16, wherein the identifier of the second node is included in a source to target transparent container within the handover request message.

18. The third node of claim 16, wherein the information indicating whether the direct data forwarding path between the second node and the third node is available is included in a target to source transparent container within the handover request acknowledgment message.

19. The third node of claim 16, wherein data forwarding from the second node to the third node is performed according to the direct data forwarding path between the second node and the third node.

20. The third node of claim 16, wherein the identifier of the second node is used for handover from evolved universal terrestrial radio access (E-UTRA)-new radio (NR) dual connectivity (EN-DC) to stand alone (SA).

* * * * *